Dec. 6, 1938.　　W. F. GROENE　　2,138,964
ORBITAL LATHE
Filed Jan. 26, 1937　　15 Sheets-Sheet 5
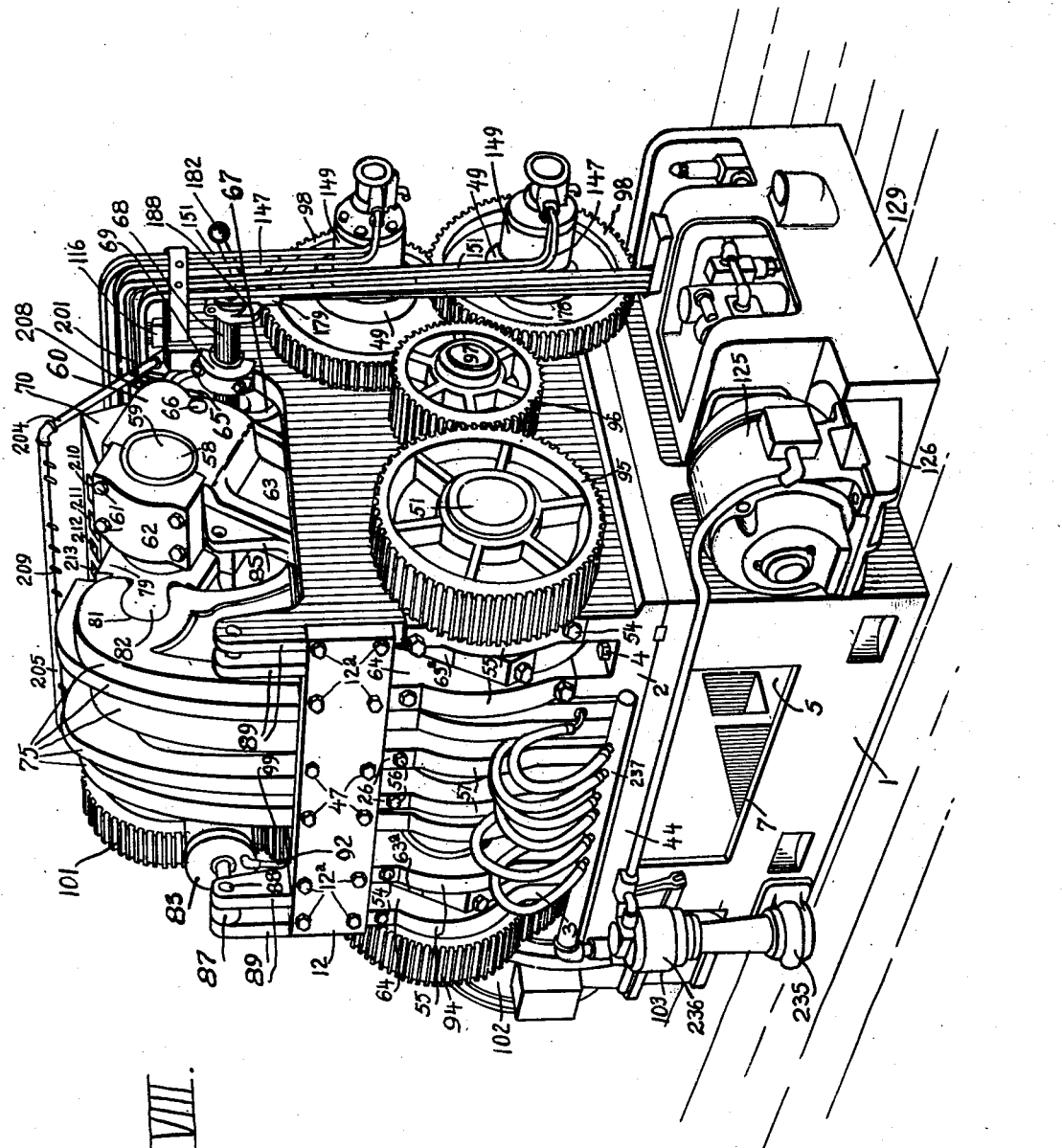
Fig. VIII.
INVENTOR.
WILLIAM F. GROENE
BY Willard L. Groene
ATTORNEY.

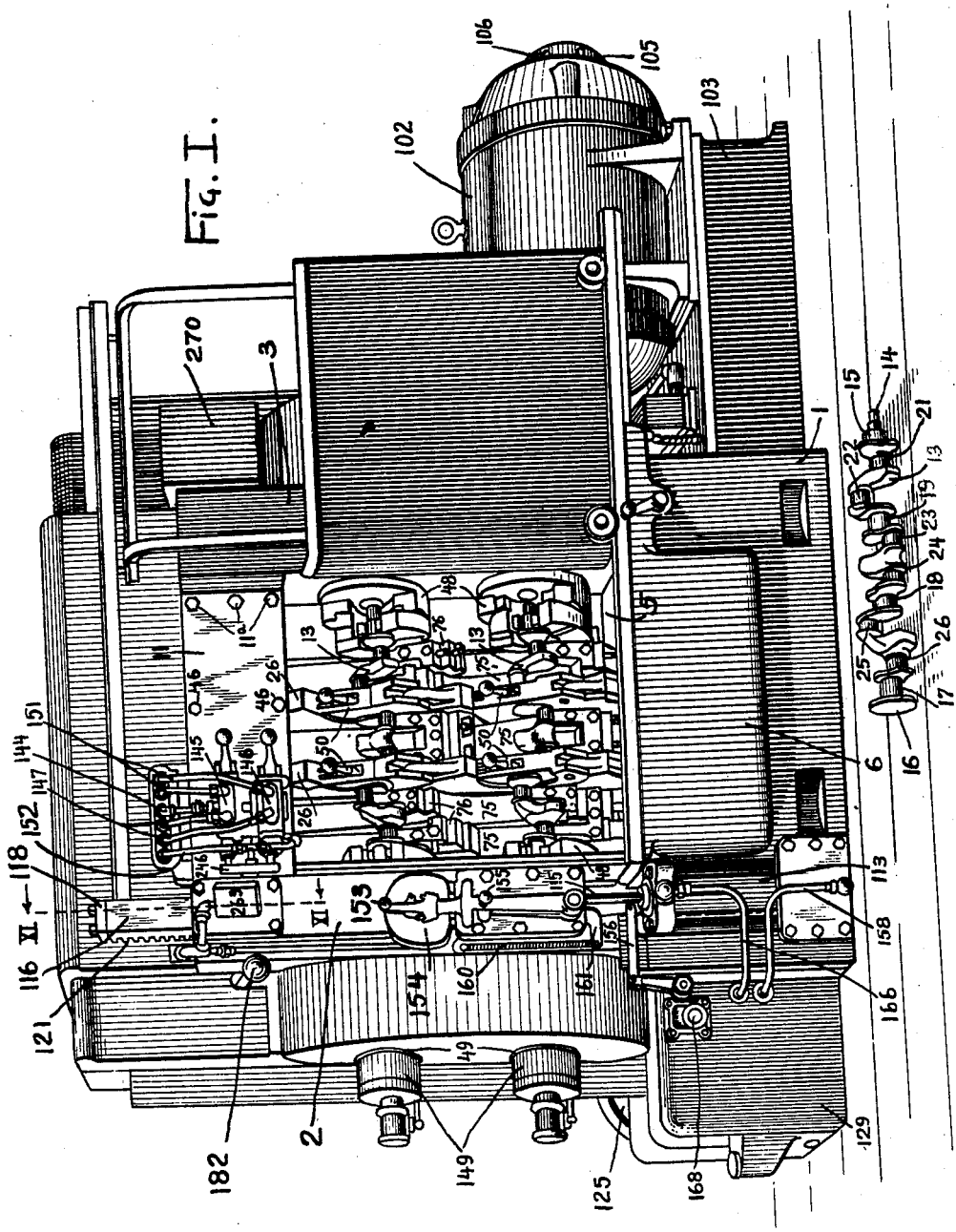

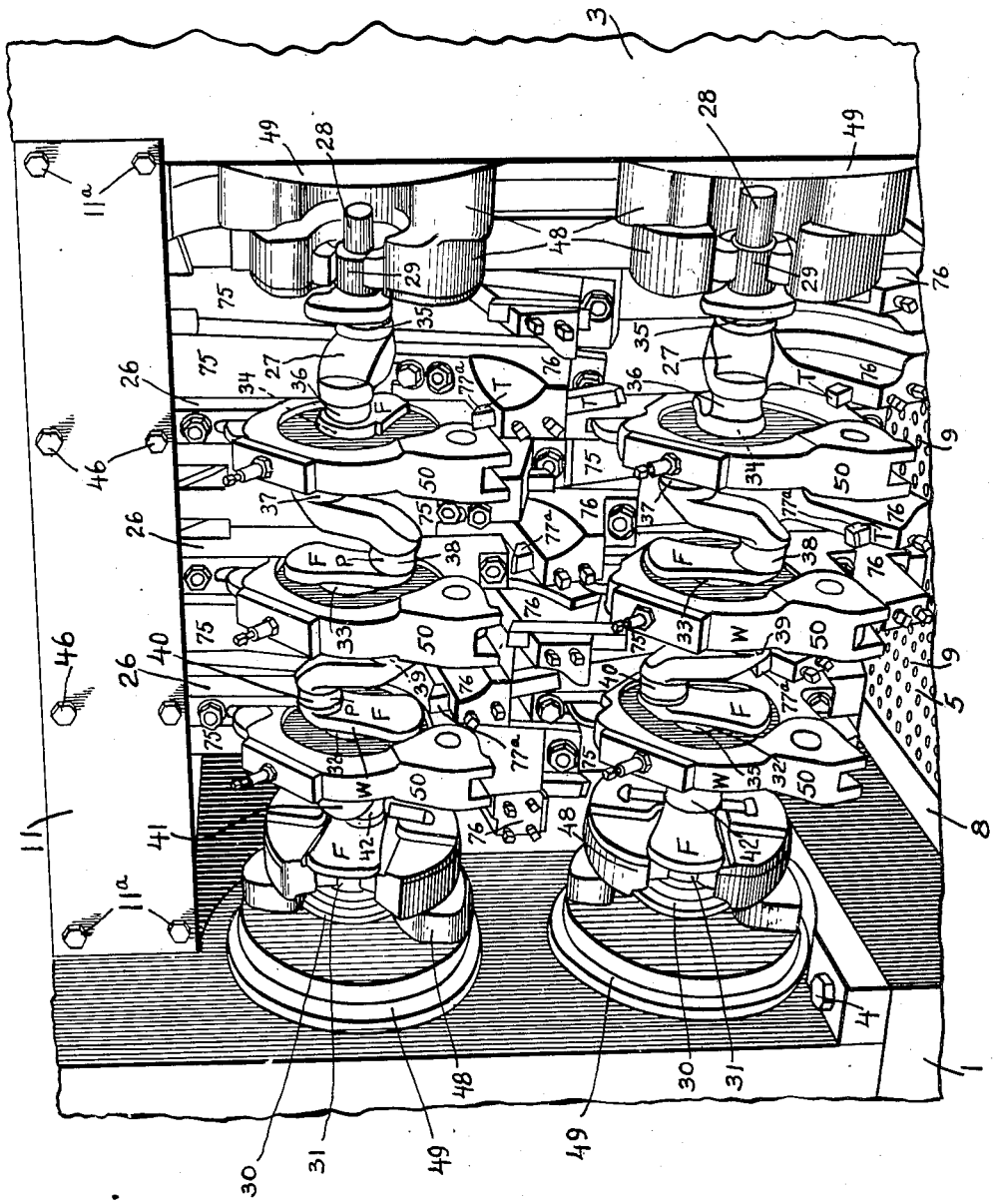

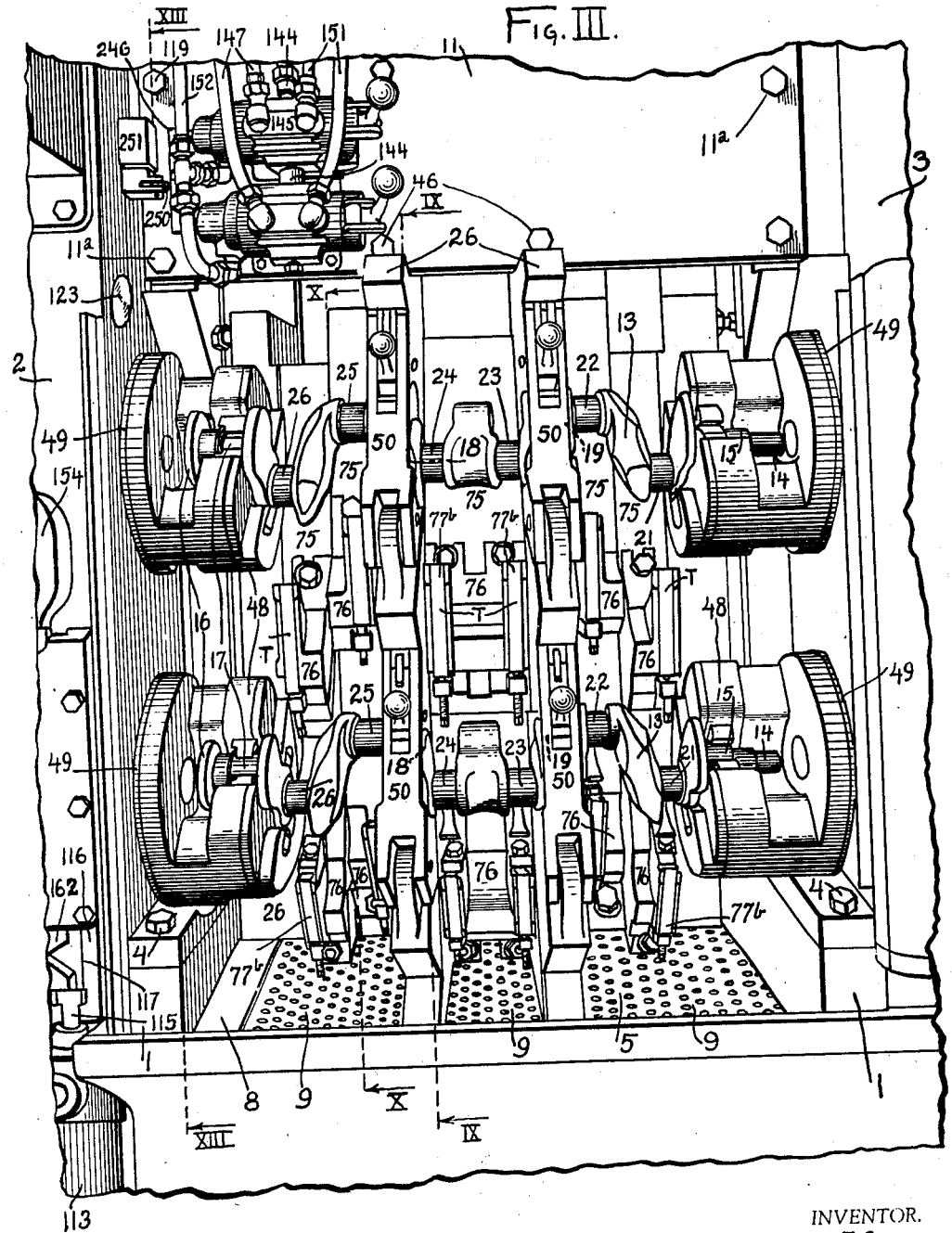

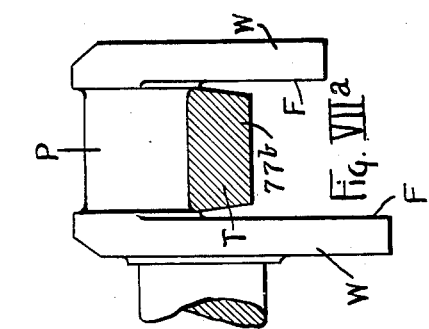
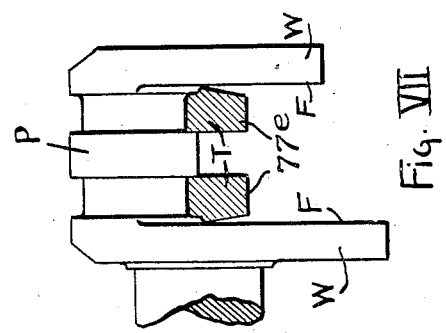
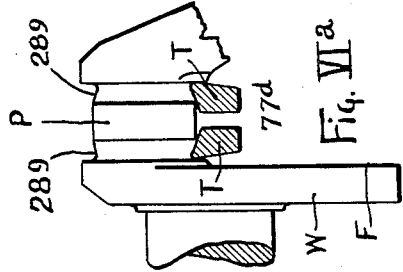
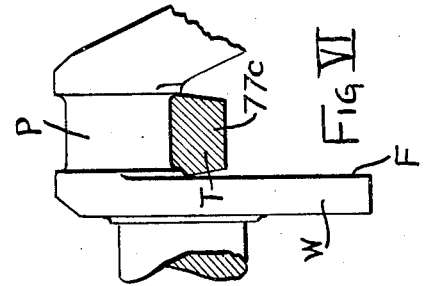
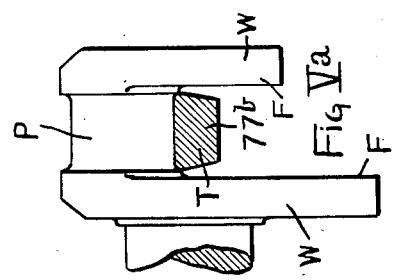
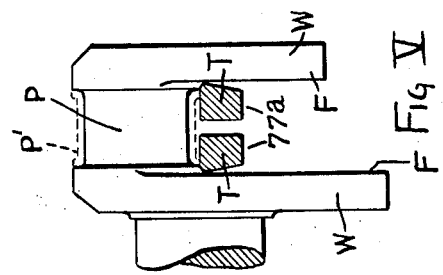
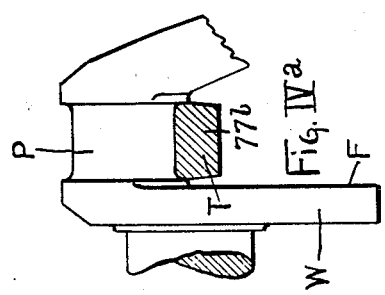
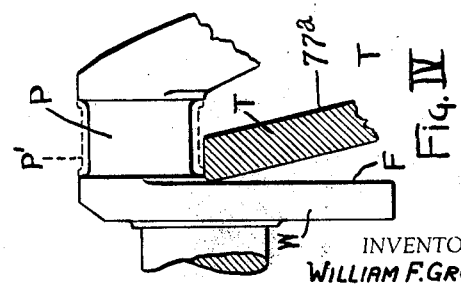

Dec. 6, 1938. W. F. GROENE 2,138,964
ORBITAL LATHE
Filed Jan. 26, 1937 15 Sheets-Sheet 6
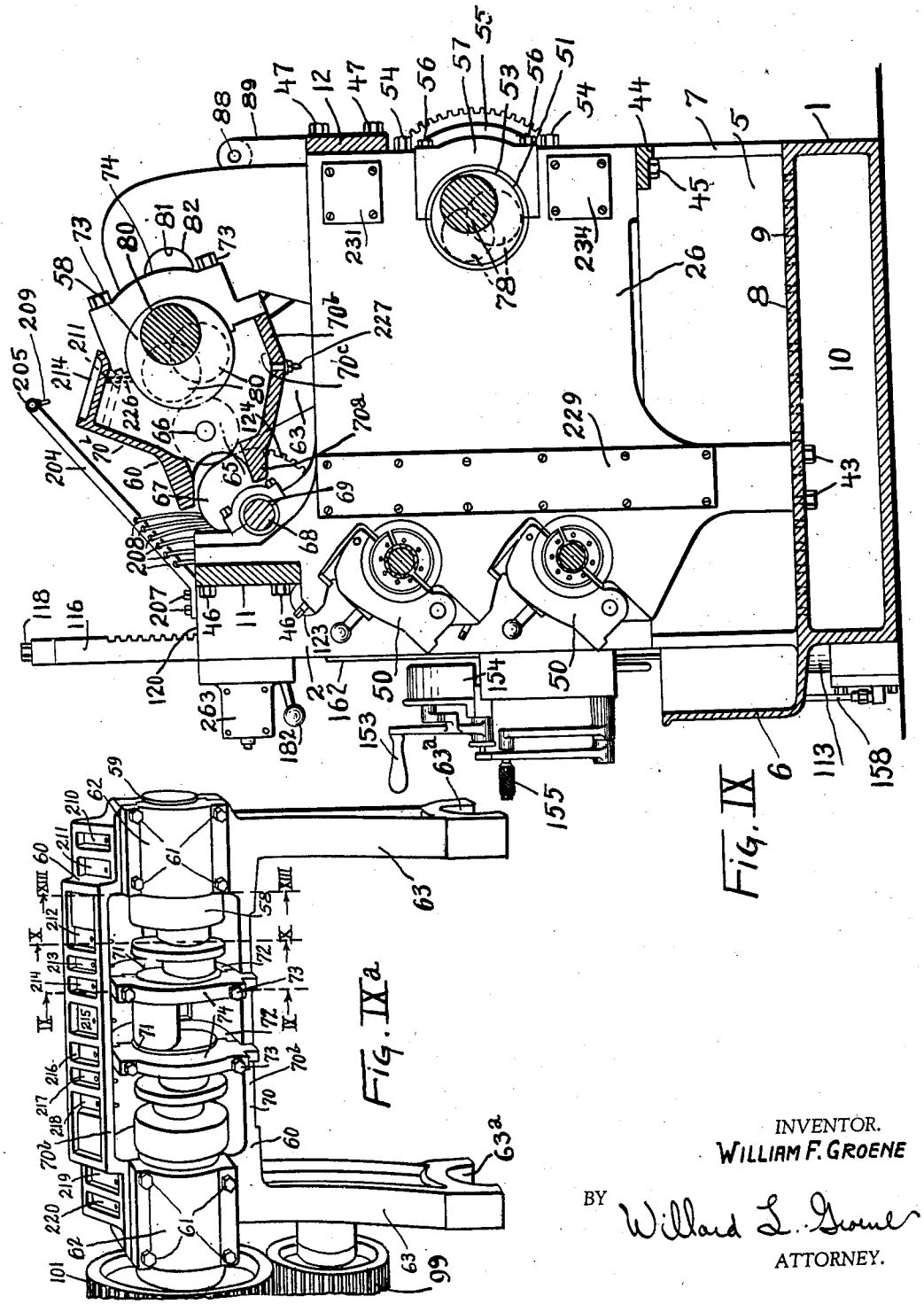
INVENTOR.
WILLIAM F. GROENE
BY Willard L. Groene
ATTORNEY.

Dec. 6, 1938.   W. F. GROENE   2,138,964
ORBITAL LATHE
Filed Jan. 26, 1937   15 Sheets-Sheet 7
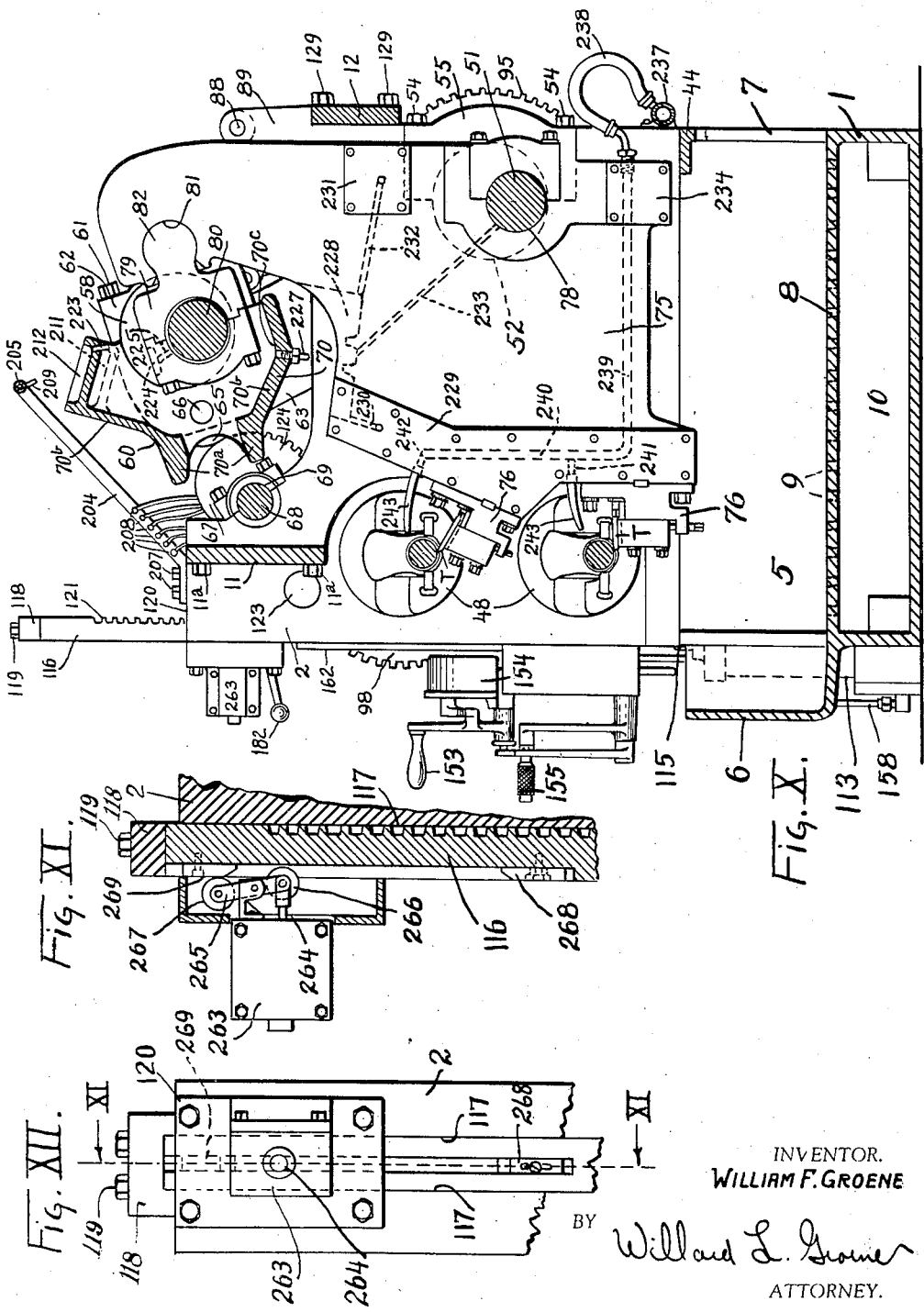
INVENTOR.
WILLIAM F. GROENE
BY Willard L. Groene
ATTORNEY.

Dec. 6, 1938.  W. F. GROENE  2,138,964
ORBITAL LATHE
Filed Jan. 26, 1937   15 Sheets-Sheet 8
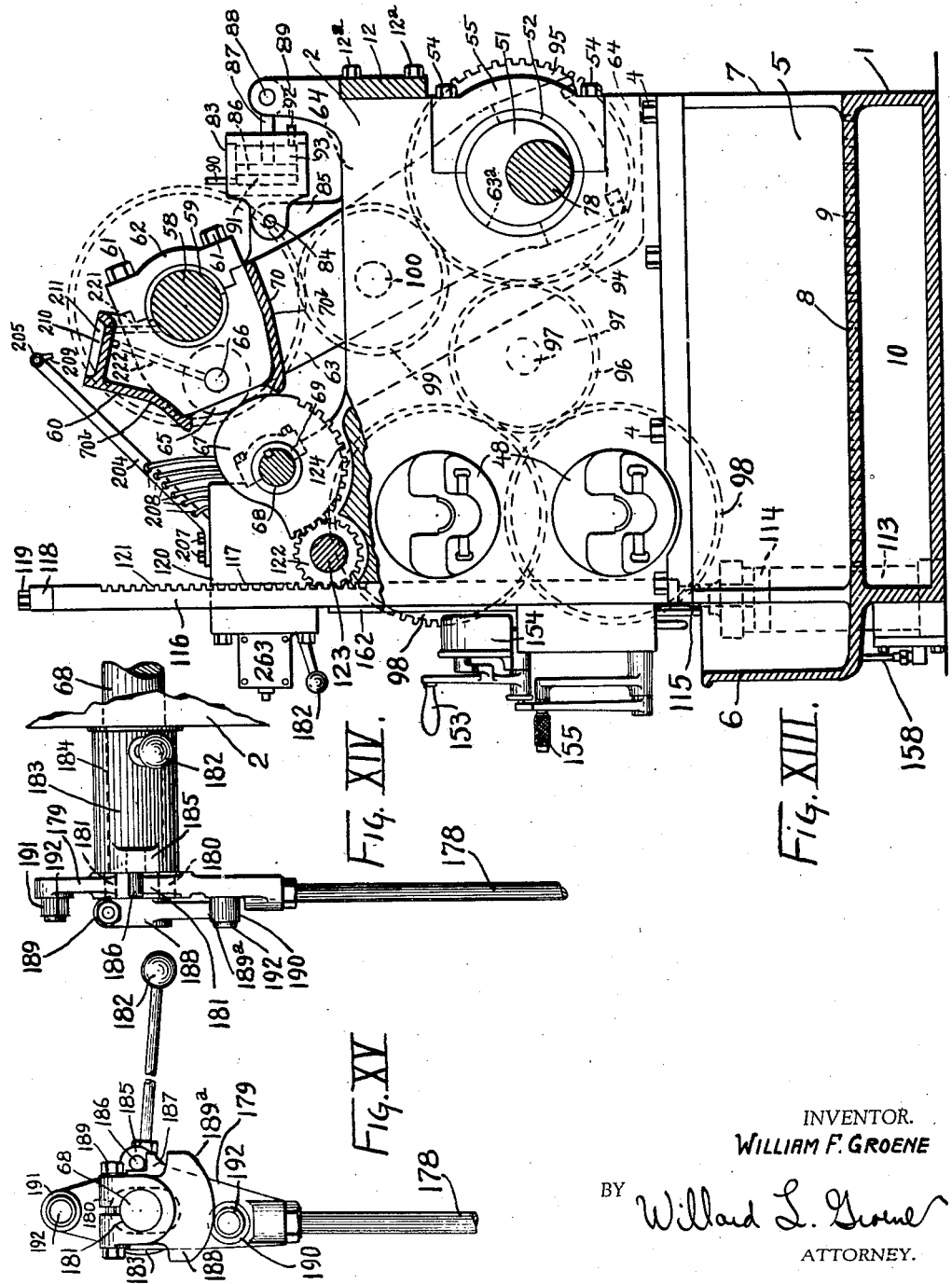
INVENTOR.
WILLIAM F. GROENE
BY Willard L. Groene
ATTORNEY.

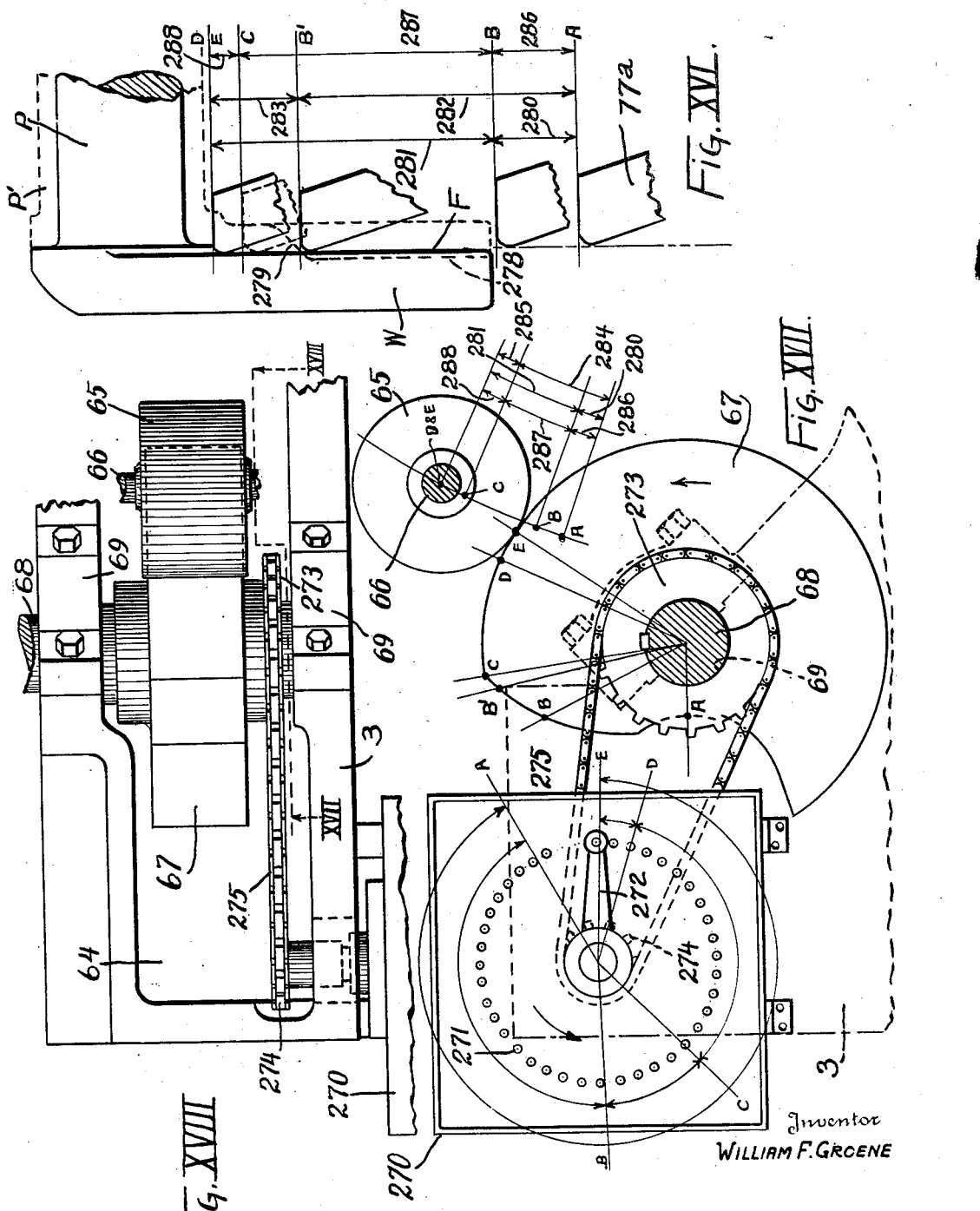

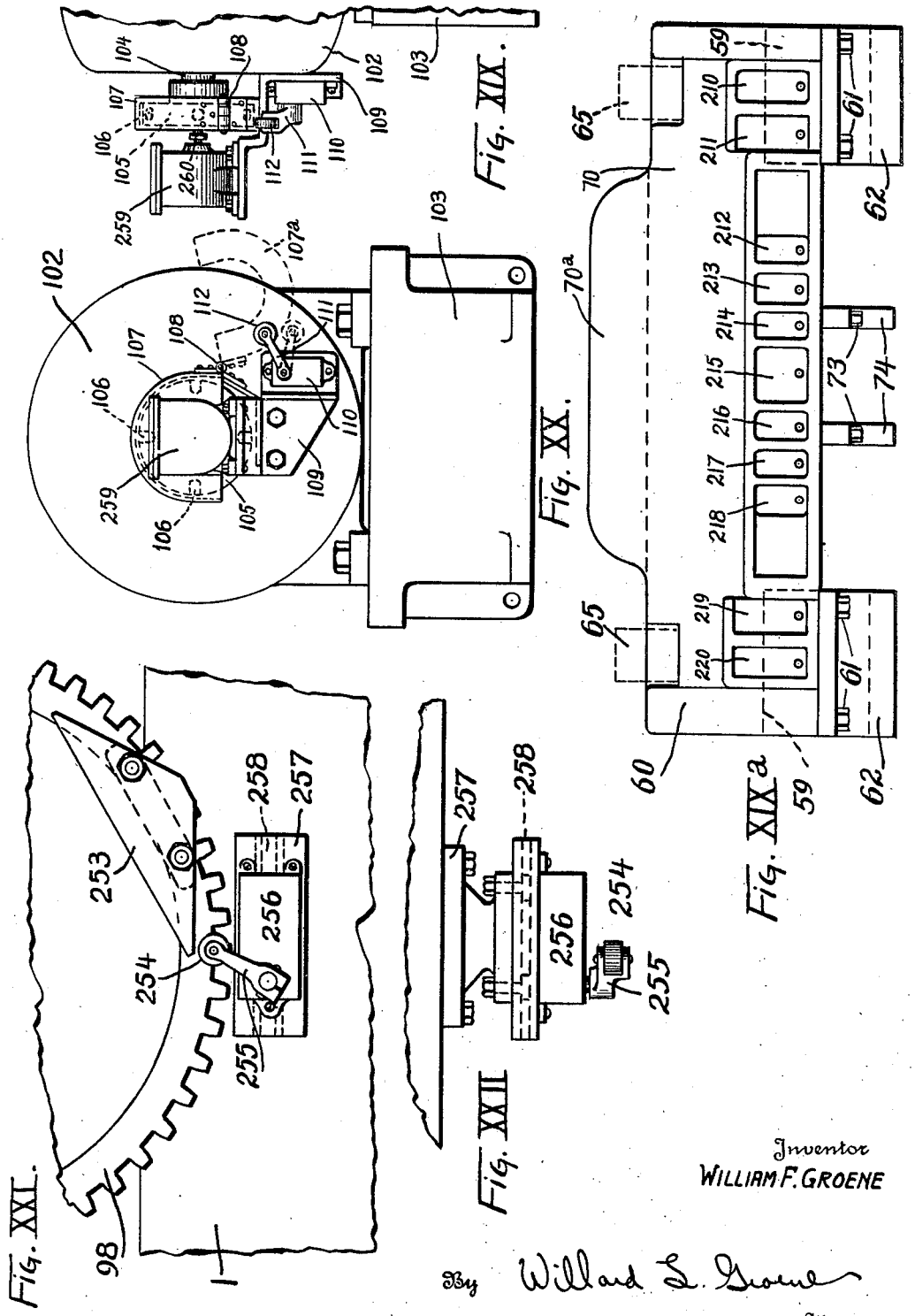

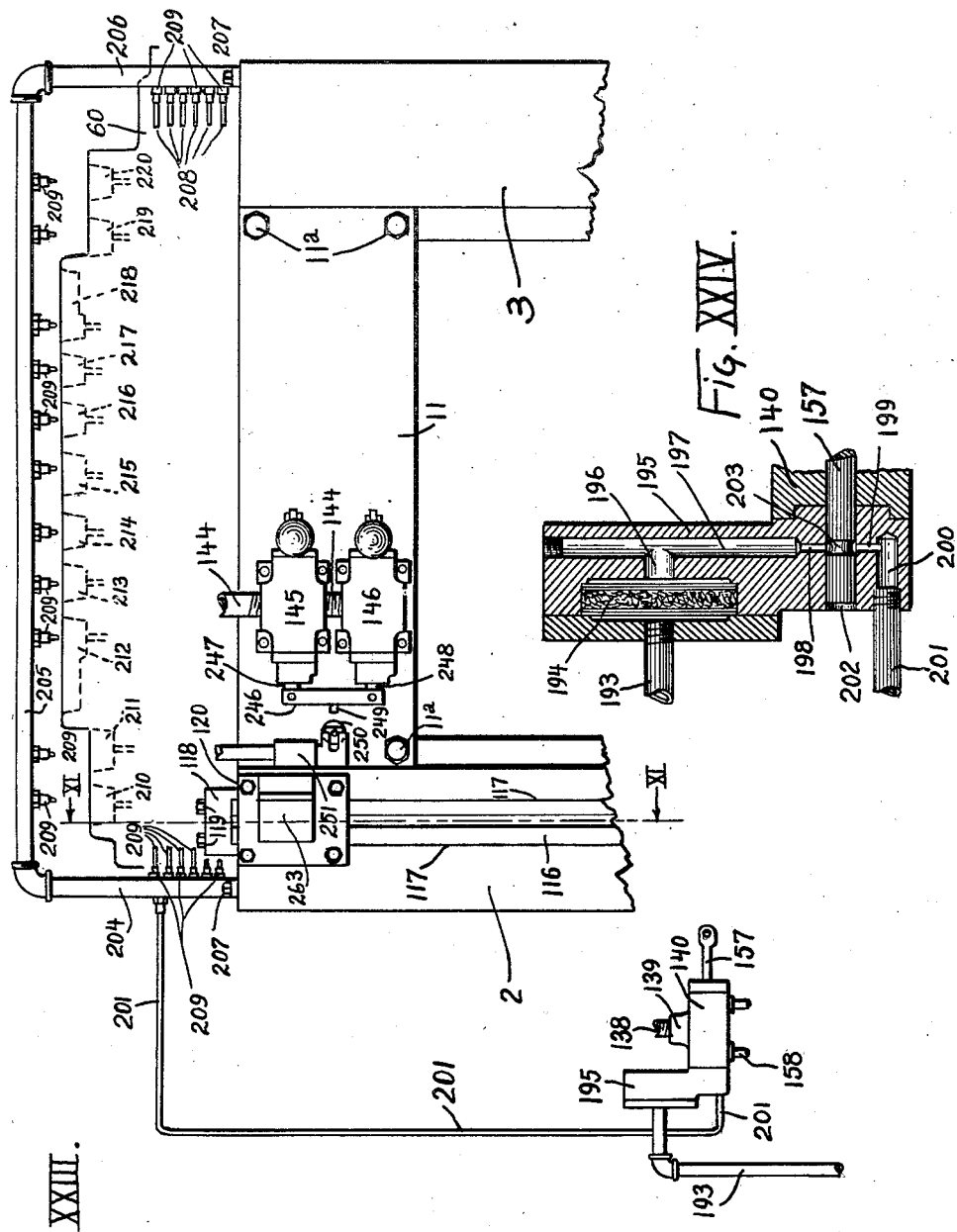

Dec. 6, 1938.　　　W. F. GROENE　　　2,138,964
ORBITAL LATHE
Filed Jan. 26, 1937　　15 Sheets-Sheet 12
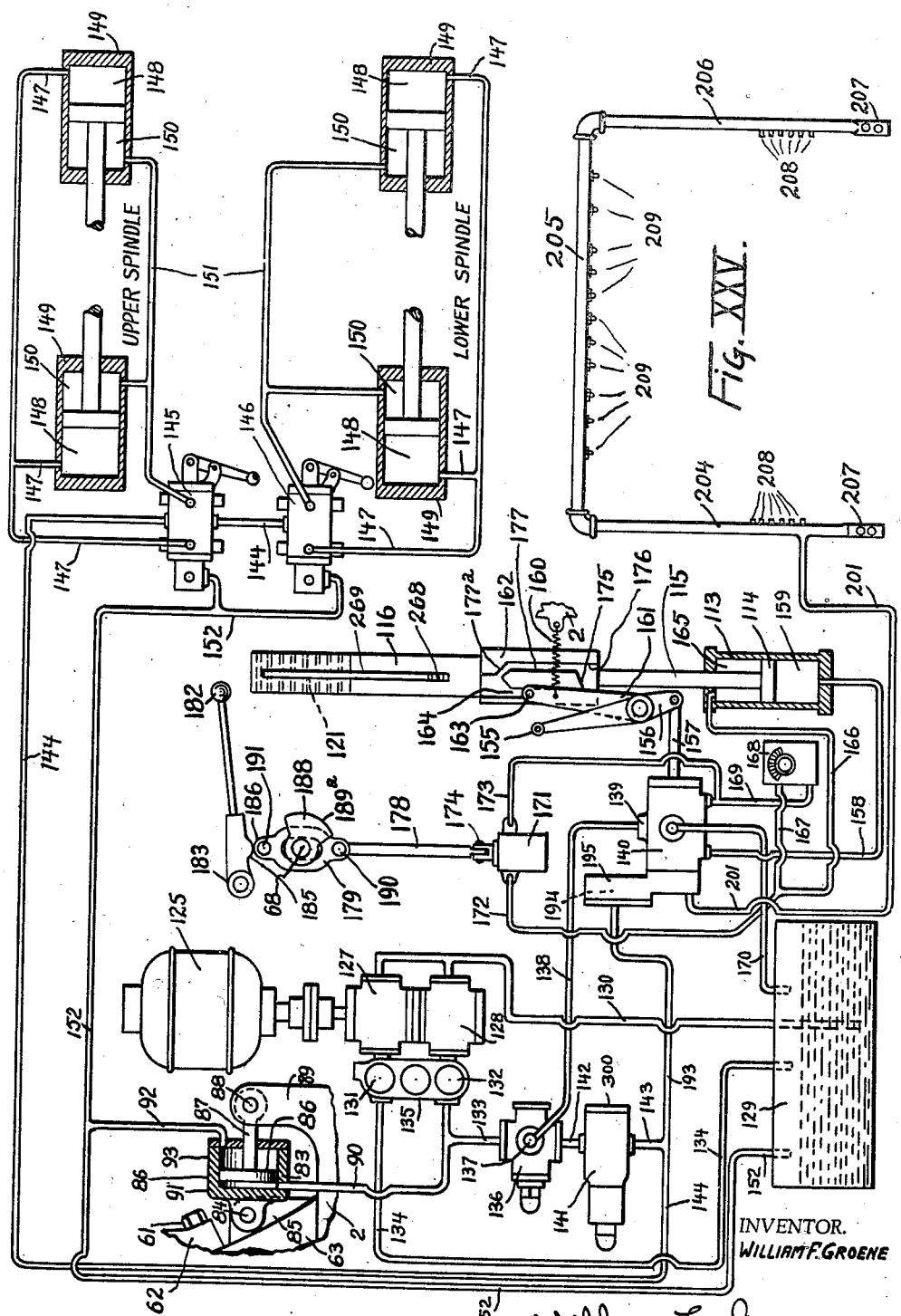
INVENTOR.
WILLIAM F. GROENE
ATTORNEY.

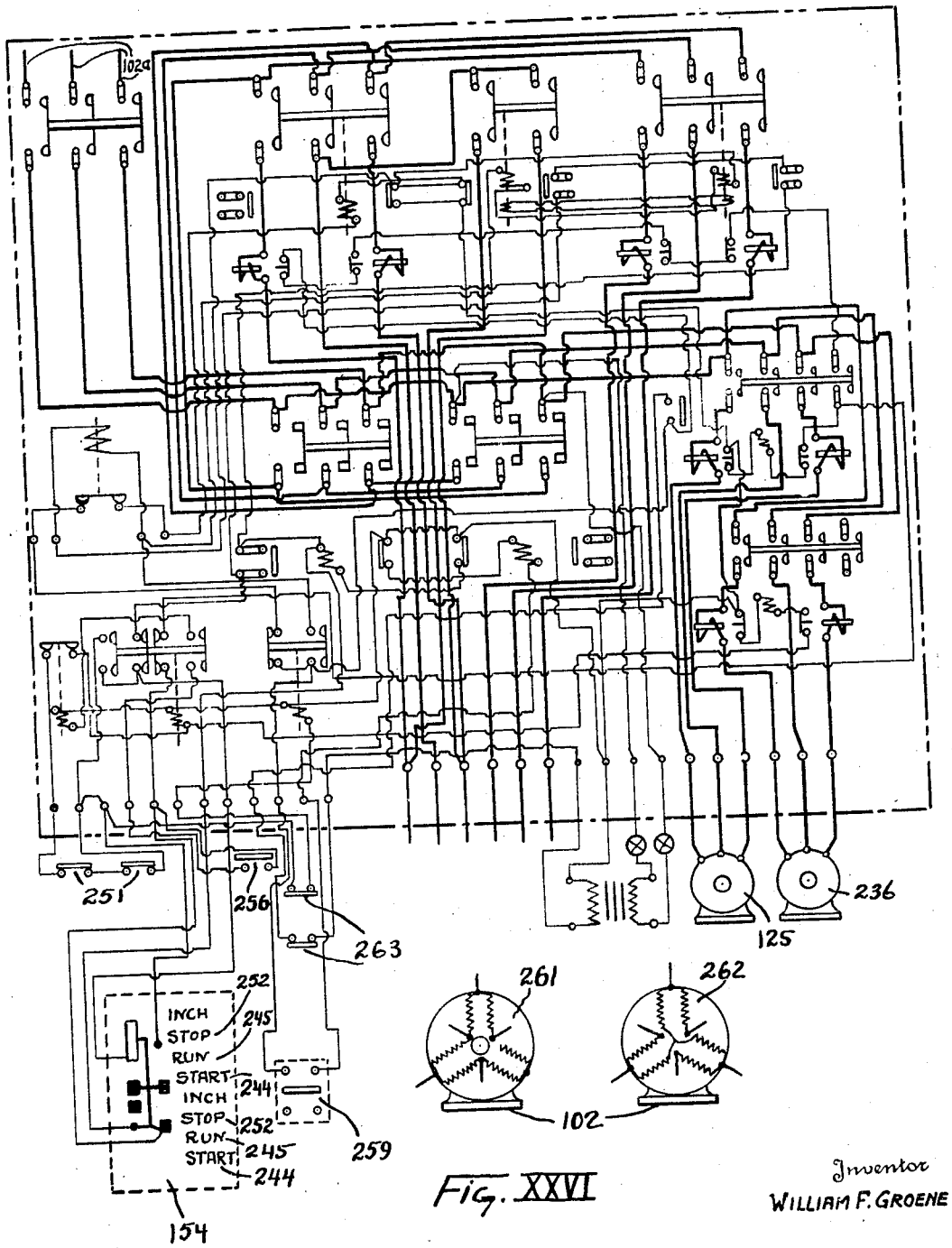
Fig. XXVI

Dec. 6, 1938.  W. F. GROENE  2,138,964
ORBITAL LATHE
Filed Jan. 26, 1937  15 Sheets-Sheet 14
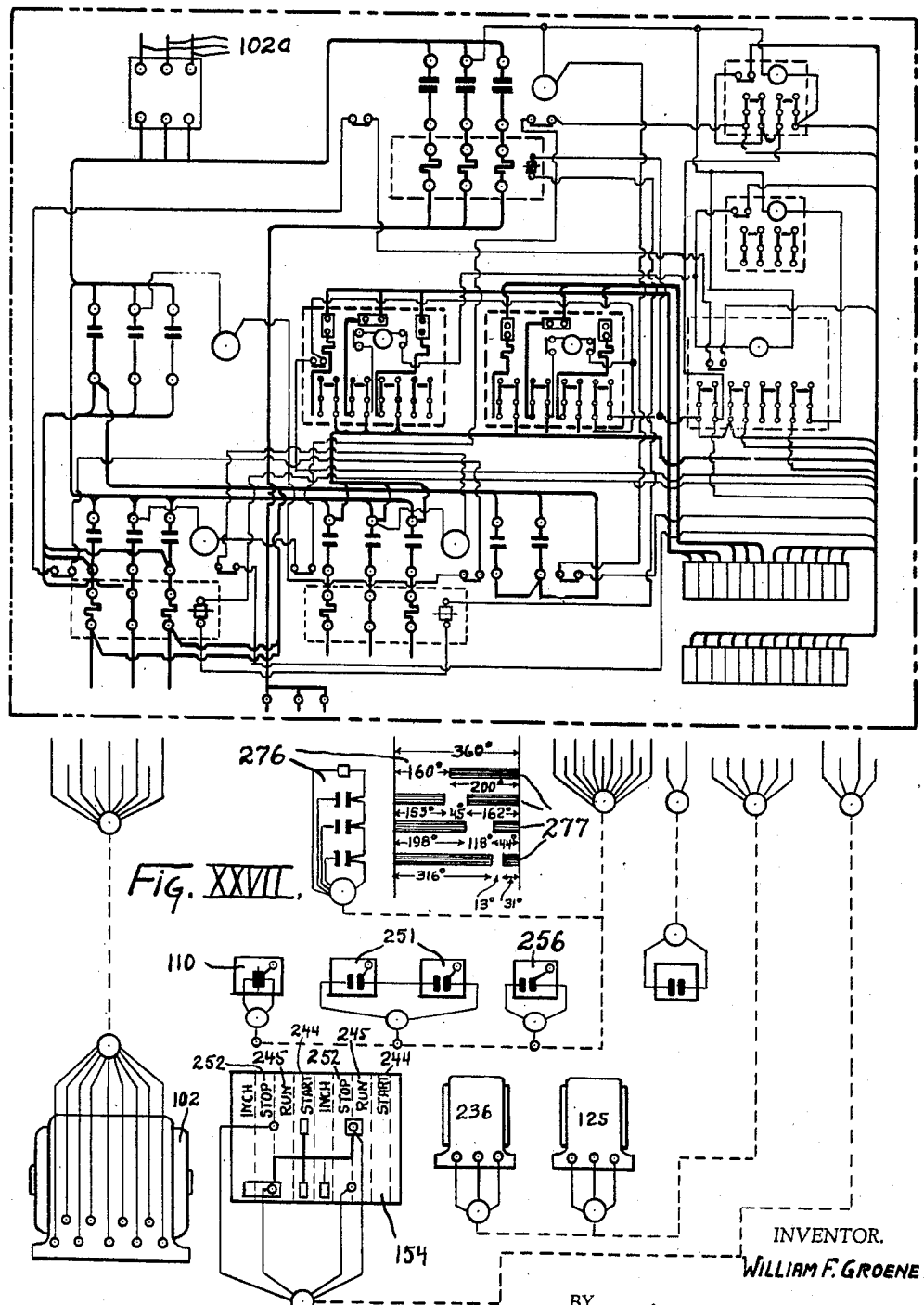
Fig. XXVII.
INVENTOR.
WILLIAM F. GROENE
BY Willard L. Groene
ATTORNEY.

Dec. 6, 1938.  W. F. GROENE  2,138,964
ORBITAL LATHE
Filed Jan. 26, 1937   15 Sheets-Sheet 15
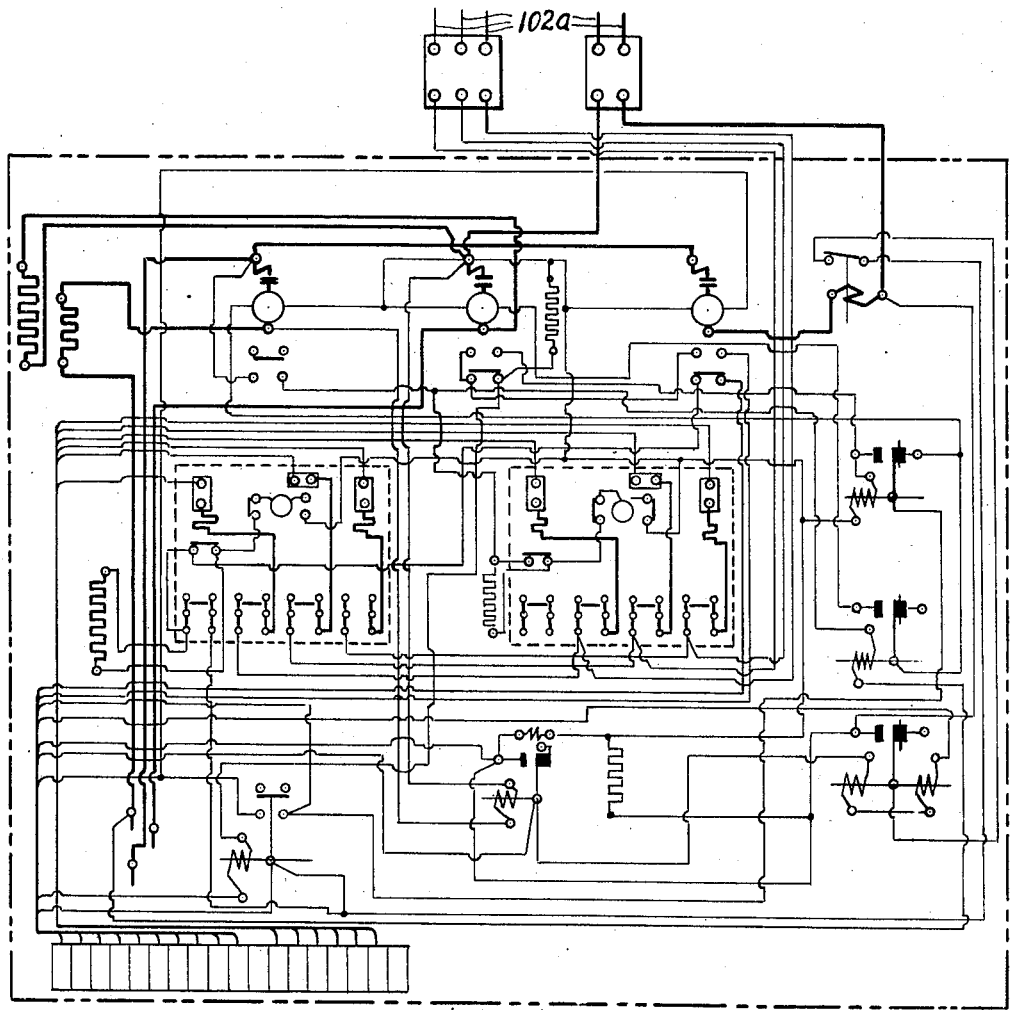
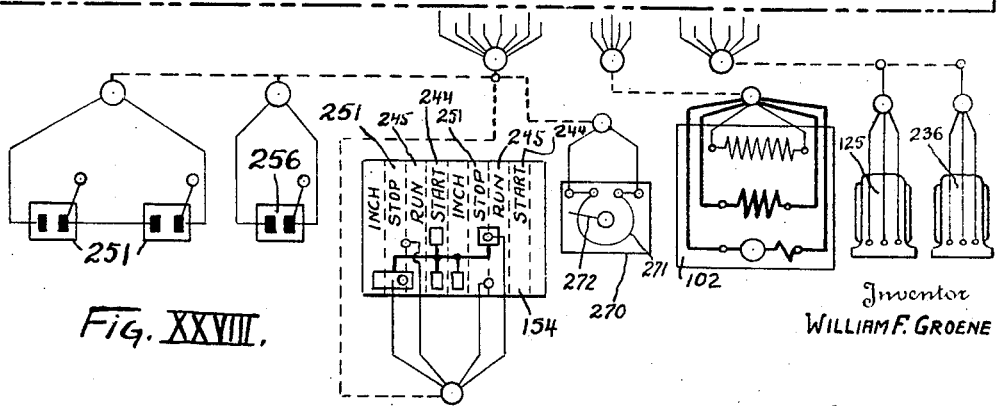
Fig. XXVIII.
Inventor
WILLIAM F. GROENE
By Willard L. Groene
Attorney Patented Dec. 6, 1938

2,138,964

UNITED STATES PATENT OFFICE 2,138,964

ORBITAL LATHE

William F. Groene, Cincinnati, Ohio, assignor to R. K. Le Blond Machine Tool Company, Cincinnati, Ohio, a corporation of Delaware Application January 26, 1937, Serial No. 122,349

57 Claims. (Cl. 82—9)

This invention pertains to orbital lathes, more particularly to the type of lathes known as crank pin turning lathes. In the exemplary embodiment to be herein set forth I show a multiple spindle orbital crankshaft lathe adapted to simultaneously machine all the crank pins and associated surfaces on a plurality of crankshafts in a single operation.

My invention consists in certain new and useful improvements, modifications, and additions to multiple spindle orbital crankshaft lathes of a character set forth in my Patent 1,934,530 issued November 7, 1933, an object of my invention being to provide means in such lathes whereby the faces of the webs adjacent a plurality of crank pins of a plurality of crankshafts may be simultaneously cheeked in a single operation.

Another object is to provide means whereby the diameters and fillets of a plurality of crank pins of a plurality of crankshafts may be turned and faced simultaneously in a single operation.

Another object is to arrange the machine so that rough turning operations may be undertaken on some of the spindles while finishing operations are simultaneously being undertaken on others of said spindles.

Another object is to arrange such a multiple spindle lathe so that some of the spindles are adapted for cheeking the faces of the webs adjacent crank pins while others of the spindles are adapted to turn the pins on a plurality of crankshafts simultaneously.

A still further object is to arrange certain of the spindles for completely finishing parts of the webs and adjacent crank pins while others of said spindles are adapted for simultaneously finishing other portions of said webs and adjacent crank pins.

It is also my intention to provide a rotary cam means for actuating the orbitally moving cutting tools in coarse feed, fine feed, and dwell and hydraulic means for rotating said cam means to rapid traverse or feeding speeds in either direction.

In connection with the hydraulically operated cam feeding mechanism I propose an arrangement whereby constant cutting speed of the tools is at all times maintained regardless of the speed of rotation of the work spindles.

I have improved the method of feeding the orbitally moving tool carrier units relative to the work in that I have modified the construction and greatly increased the rigidity of the cradle arrangement for swinging the upper master crankshaft.

I have also improved and greatly simplified the method of connecting the linkage connection between the upper master crankshaft and the tool carrying units.

I have further provided a unique combined manual and automatic means for controlling the rapid traverse of the cutting tools relative to the work pieces whereby the rapid traverse may be actuated manually independent of and without effecting the normal automatic means for causing said rapid traverse movements.

A further object is to provide means for feeding cutting tools relative to a plurality of crank pins of a plurality of crankshafts simultaneously in rapid traverse, coarse feed, fine feed and dwell to cheek the faces of webs adjacent crank pins and to turn said crank pins in a single operation.

A further object is to feed cutting tools relative to a plurality of crank pins of a plurality of crankshafts simultaneously in rapid traverse and coarse feed to cheek the faces of webs adjacent said crank pins in a single operation.

A further object is to feed cutting tools relative to a plurality of crank pins of a plurality of crankshafts simultaneously in rapid traverse and fine feed to turn said crank pins in a single operation.

And still a further object is to feed cutting tools relative to a plurality of crank pins of a plurality of crankshafts simultaneously in rapid traverse, coarse feed, fine feed, and dwell whereby certain of said tools do cheeking operations on some of webs adjacent said crank pins while others of said tools do turning on others of said crank pins in a single operation.

I also provide a safety device in connection with the manual means for rotating the spindle driving mechanism whereby the power means for driving the spindles is rendered ineffective when the spindles are being actuated manually.

A unique arrangement is provided for directly lubricating the working parts of the lathe from the pressure fluid system for feeding the cutting tools.

I further provide means for maintaining the feeding cradle in contact with the feeding cams to eliminate cutting vibration in the cutting tools and to assure positive return of the tool carrier units at the end of the cutting cycle.

I also have arranged the machine whereby the spindle speeds are automatically controlled by the relative position of the work and tools and the nature of the work being done by the tools.

One arrangement for turning the crank pins on a plurality of crankshafts simultaneously is to cause the spindles to rotate automatically at relatively high speed until the tools have substantially finished their turning operation and then automatically cause the spindles to rotate at relatively slow rate as the tools enter the dwell period to precisely finish the pin without chatter or vibration and the resultant defects in the work surface.

Another arrangement when doing cheeking and pin turning operations simultaneously on the pins of a plurality of crankshafts is to cause the spindles to rotate relatively slowly at the beginning of the cheeking operation and to automatically increase in speed toward the end of the cheeking cut, to remain in high speed while the pins are being turned, and to drop automatically back to relatively slow speed as the cutting tools enter the dwell period for sizing the pins.

Other features of my invention will be pointed out in the following description of the drawings in which:—

Figure I is a front perspective view of a multiple spindle orbital crankshaft lathe adapted to utilize the principles of my invention.

Figure II is an enlarged perspective view of a portion of the front of the machine showing crankshafts chucked on the work spindles for machining operations on the cheeks of the webs adjacent the crank pins.

Figure III is an enlarged perspective view of a portion of the front of the machine showing crankshafts chucked on the work spindles for turning the diameters and fillets of the crank pins.

Figure IV shows a portion of a crankshaft with a tool applied to machine the cheek of a web adjacent a crank pin.

Figure IVa shows a portion of a crankshaft with a tool applied to turning the diameter and fillets of a crank pin adjacent the machined web of Figure IV.

Figure V shows a portion of a crankshaft with tools applied to machine the cheeks of the webs adjacent a crank pin.

Figure Va shows a portion of a crankshaft with a tool applied to turning the diameter and fillets of a crank pin adjacent the machined webs of Figure V.

Figure VI shows a portion of a crankshaft with a tool adapted to cheek the face of a web adjacent a crank pin and to turn the diameter of the crank pin.

Figure VIa shows a portion of a crankshaft with tools applied to face and neck the fillets of the crank pin of Figure VI.

Figure VII shows a portion of a crankshaft with tools applied to cheek the faces of the webs adjacent a crank pin and to turn a portion of the diameter of the crank pin.

Figure VIIa shows a portion of a crankshaft with a tool applied to turning the unfinished diameter and fillets of a crank pin adjacent the machined webs of Figure VII.

Figure VIII is a perspective view of the rear of the machine of Figure I particularly showing the arrangement of the tool carriers, the driving gears for the master crankshafts and spindles, and the hydraulic feeding system.

Figure IX is a vertical transverse section on the line IX—IX of Figures III and IXa particularly showing the left hand steady rest unit and the support bearing for the intermediate bearings of the upper master crankshaft.

Figure IXa is a rear perspective view of the feeding cradle particularly indicating the integral structure, the mounting arrangement for the upper master crankshaft, and the lubricant distributing manifold.

Figure X is a vertical transverse section on the line X—X of Figures III and IXa particularly showing orbitally moving tool carrier unit.

Figure XI is a vertical transverse section on the line XI—XI of Figures I, XII, and XXIII particularly showing the arrangement of the limit switch for changing speeds for the work spindles.

Figure XII is an enlarged front elevation of the upper portion of the left hand housing shown in Figures I and XXIII.

Figure XIII is a vertical transverse section on the line XIII—XIII of Figure III and IXa, partly broken away, to more clearly show the mechanism for actuating the feeding cams.

Figure XIV is a front elevation of the combined manual and automatic rapid traverse control mechanism located at the upper left hand end of the left hand housing.

Figure XV is an end elevation of the mechanism shown in Figure XV.

Figure XVI is diagrammatic illustration of various modes of feeding cheeking tools in the lathe.

Figure XVII is a right hand end elevation partly in section on line XVII—XVII of the upper portion of the right hand housing particularly showing the variable speed control device for the spindles.

Figure XVIII is a plan view of the top front portion of the right hand housing showing the mechanism of Figure XVII.

Figure XIX is a rear view of the outer end of the main driving motor showing the safety device in connection with the manual means for rotating said motor.

Figure XIXa is a plan view of the top of the feeding cradle shown in IXa.

Figure XX is an end elevation of the motor and mechanism shown in Figure XIX.

Figure XXI is a right hand end elevation of a portion of the machine showing a part of the lower spindle gear and cam mechanism for operating the limit switch for dynamic braking spindle rotation.

Figure XXII is a plan view of the mechanism shown in Figure XXI.

Figure XXIII is an enlarged front elevation of the upper portion of the lathe with covers removed particularly showing the lubricant distributing system for the working parts of the lathe.

Figure XXIV is a section through the control valve for the lubricant distributing system shown in Figure XXIII.

Figure XXV is a diagrammatic layout of the hydraulic operating and control mechanism for the lathe.

Figure XXVI is a wiring diagram of the electrical equipment utilized to operate the spindle drive motor and accessories, wherein the spindles are operated at a high speed and a low speed.

Figure XXVII is a wiring diagram of the electrical equipment utilized to operate the spindle drive motor and accessories, wherein the spindles are operated at three different speeds.

Figure XXVIII is a wiring diagram of the electrical equipment utilized to operate the spindle drive motor and accessories, wherein the spindles are operated at variable speed.

The general arrangement of the machine of the exemplary disclosure is substantially like that shown in my earlier Patent Number 1,934,530 excepting that in this disclosure only two work spindles are shown whereas in said patent three work spindles are employed. The machine comprises a rectangular base 1 to which are fixed the left hand housing 2 and the right hand housing 3 by means of suitable bolts 4. Between the housings 2 and 3 the base 1 is provided with a large chip compartment 5 which has an apron 6 at the front of the machine to prevent coolant and chips from escaping on the floor and an access opening 7 at the rear whereby chips may be removed without interfering with the operation of the lathe. The floor 8 of the chip compartment is provided with the usual drainage screens 9 to drain the coolant from the chips into the coolant chamber 10 from which it is pumped to the cutting tools in a conventional manner. The upper ends of the housings 2 and 3 are securely fastened together by means of bolts 11a passing through the front tie bar 11 and by bolts 12a passing through the rear tie bar 12.

Between the housings 2 and 3 are located one or more steady rest units 26 the number depending upon the number of intermediate line bearings present on the crankshaft being machined. For example, in Figures I and III, I show the machine applied to a six-throw four-line-bearing crankshaft 13 having the stub end 14 and its associated line bearing 15; the flange end 16 and its associated line bearing 17; the intermediate line bearings 18 and 19; and crank pins 21, 22, 23, 24, 25, and 26. Two steady rest units 26 are therefore required to support the intermediate line bearings 18 and 19 of the crankshaft 13.

Another example is shown in Figure II wherein the machine is adapted to an eight-throw five-line bearing crankshaft 27 having the stub end 28 and its associated line bearing 29; the flange end 30 and its associated line bearing 31; the intermediate line bearings 32, 33, and 34; and crank pins 35, 36, 37, 38, 39, 40, 41, and 42. Three steady rest units 26 are therefore required, in this instance, to support the intermediate line bearings 32, 33, and 34.

Noting particularly Figure IX, the steady rest units 26 are secured to floor 8 of the chip compartment by bolts 43 and to the rib 44 at the rear of the base 1 by bolts 45. The units 26 are also securely fastened to the front tie bar 11 by bolts 46 and to the rear tie bar by bolts 47.

The crankshafts, as for example the crankshafts 13 or 27, are chucked and driven from their ends by means of chucks 48, preferably of a character shown in my Patent Re. 19,730 and 2,030,142, which are carried on appropriate spindles 49 rotatably mounted in each of the housings 2 and 3. On the steady rest units are provided steady rests 50 adapted to engage and journal the intermediate line bearings of the crankshafts, preferably of a character as set forth in my Patents 1,906,577 and 1,934,530 and in my application Serial No. 108,038 filed October 28, 1936.

*Feeding cradle*

At the rear of the machine is journaled the lower master crankshaft 51 in suitable bearings 52 in each housing 2 and 3 and also in bearings 53 in each steady rest unit 26, the crankshaft 51 being properly held in place in bearings 52 by bolts 54 passing through caps 55 and in bearings 53 by bolts 56 passing through caps 57. An upper master crankshaft 58 is journaled in appropriate bearings 59 (Figures VIII and XIII) in the feeding cradle 60 and is held in place in said bearings by bolts 61 passing through caps 62. The cradle 60 has downwardly extending pivot arms 63 passing in slots 64 formed in each of the housings 2 and 3 and having their lower ends 63a pivotally mounted about the axis of rotation of the lower master crankshaft 51, preferably about the periphery of the bearings 52.

The cradle 60 has a roller 65 at each end rotatably mounted on a suitable stud 66 fixed in the cradle 60 which contacts the periphery of the rotary feed cams 67 located in the slots 64 in each housing 2 and 3 and fixed on the cam shaft 68 which shaft is journaled in appropriate bearings 69 in each housing 2 and 3. It can thus be seen that upon proper rotation of the cam shaft 68 and cams 67 the cradle 60 may be rocked around its pivotal mounting about the bearings 52 to thereby move the upper master crankshaft upwardly and rearwardly or vice versa.

This feeding cradle 60 has been greatly improved and its structure altered over that of the arrangement of swinging the upper master crankshaft in my Patent 1,934,530 in that I have provided a massive structural section 70 comprising the ribs 70a and web sections 70b formed integral with pivot arms 63 thereby securely tying said arms together and cause said arms 63 to swing in unison upon operation of the cams 67. Thus any twisting and distortion which might be caused in the master crankshaft 58 in the former structure of Patent 1,934,530 is fully eliminated. Also it is to be noted that in this arrangement the intermediate line bearings 71 of the master crankshaft 58 are rigidly supported in appropriate bearings in the web sections 72 formed integral with the web sections 70b of the cradle 60 and held in said bearings by means of the usual bolts 73 passing through the caps 74.

The tool carrier units 75, Figure X, carrying the tool holders 76 and tools T for cutting operations on the crank pins of the work pieces are journaled on the crank pins 78 of the lower master crankshaft 51 and connected to the upper master crankshaft 58 by means of the linkage connection 79 which connection is appropriately journaled about the crank pins 80 of said upper master crankshaft 58 and is attached to the tool carrier units 75 by a unique pivotal connection comprising a partial cylindrical socket or bearing 81 formed in said units into which is nicely fitted a cylindrical integral boss 82 of the linkage connection 79. The advantage of this construction is that fewer parts are required than in the former constructions used for this purpose and also permits the use of the full width of both the tool carrier units and the linkage connection at the point of juncture thereby giving much greater rigidity and strength at this vital part of the machine. By this arrangement the tool carrier units 75 may be swung about the crank pins 78 of the lower master crankshaft 51 upon swinging of the cradle 60 in a manner already described to feed the cutting tools T to and from the crank pins of the work pieces.

Unique mechanism is provided to damp out vibration in the feeding cradle and tool carrier units during cutting operations and to effect positive return of the cradle after said operations are completed comprising a resilient means to yieldingly urge the cardle 60 with its rollers 65 at all times against the peripheral cams 67. For example, I prefer to utilize a cylinder 83 which is pivotally mounted by a suitable pin 84 fixed to a boss 85 formed on the arms 63 of the cradle 60 in which is mounted a reciprocatable piston 86 connected to a piston rod 87 which in turn is pivotally mounted by a suitable pin 88 in the upstanding integral arm 89 of each of the housings 2 and 3. Fluid pressure delivered through the pipe 90 is at all times maintained in chamber 91, leakage past the piston 86 being drained off through the pipe 92 leading from chamber 93. Sufficient travel allowed the piston 86 in cylinder 83 and the pivotal connections about pins 84 and 88 permit the continuous application of pressure to force the cradle toward the cams 67 throughout its full range of swinging.

Driving mechanism for spindles and master crankshafts

Noting particularly Figures VIII and XIII, on the ends of the lower master crankshaft 51 projecting beyond the bearings 52 of the housings 2 and 3 are fixed the gears 94 and 95 each gear being adapted to drive idler gears 96 rotatably mounted on studs 97 fixed in the outside faces of the housings 2 and 3 and which idler gears 96 in turn engage gears 98 of identical size as the gears 94 and 95 mounted on the work spindles 49. The gear 94 also is adapted to drive an idler gear 99 rotatably mounted on a stud 100 fixed in an arm 63 (Figure IXa) of the cradle 60 which idler gear in turn is adapted to drive the gear 101, of identical size of the gear 94, fixed on an end of the upper master crankshaft 58. Thus it can be seen that rotation of the gears 94 and 95 and lower master crankshaft 51 will cause similar synchronous rotation of the work spindles 49 and the upper master crankshaft 58. The above mechanism is actuated by means of the usual driving motor 102 mounted on the bracket 103 fixed to the right hand end of the base 1, power being transmitted through the usual reduction gearing, preferably to the gear 94.

On the outer end of the motor shaft 104, opposite the driving pinion end, is fixed a capstan head 105, Figures I, XIX, and XX, which has spaced radially extending holes 106 formed in its periphery whereby a bar may be inserted in any of said holes to provide manual means for rotating the motor 102 and thereby the spindles and master crankshafts. It is to be noted that in the event the operator inadvertently left the bar in one of the holes 106 of the capstan head 105 and started the motor 102 serious damage would result to the motor and possible injury to the operator. In order to avoid such an occurrence I have provided a novel safety device in connection with the capstan head 105 whereby the bar must be removed from the head before the motor 102 can be rendered operative.

This safety device comprises a U shaped cover 107 which is hinged at 108 to a bracket 109 attached to the motor 102 and is thereby adapted to be swung over the capstan head 105 or to be swung away from said disc to a position indicated at 107a. Mounted on the bracket 109 is a limit switch 110 which controls appropriate relays for connecting or disconnecting the main source of power from the motor 102 in the usual manner. The limit switch 110 has the control arm 111 and roller 112 which are actuated by the cover 107 when in position 107a whereby power is disconnected from the motor 102 and at which time a bar may be applied to the capstan head 105. Before the motor 102 can be rendered operative the cover 107 must be swung over the capstan head 105 to relieve the limit switch 110 to connect power to the motor which forces the operator to remove the bar from the capstan head to accomplish this result.

Feed drive mechanism

Noting particularly Figure XIII, the means for actuating the cams 67 fixed on the cam shaft 68 comprises the usual hydraulic cylinder 113 vertically mounted on the front of the base 1 directly beneath the housing 2. In the cylinder is a reciprocatable piston 114 to which is connected the upwardly extending piston rod 115 which in turn is connected to the vertically reciprocatable rack 116 slidably mounted in appropriate guideways 117 found in the front face of the housing 2. A stop block 118 secured to the upper end of the rack 116 by screws 119 is adapted to abut against the top surface 120 (Figure XII) of the housing 2 to limit downward travel of said rack 116 and piston 114, so that the piston does not bottom in said cylinder upon return of the tool to starting position.

Rack teeth 121 cut on the rearward face of the rack 116 engage the idler gear 122 rotatably mounted on the stud 123 fixed in the housing 2 which idler in turn engages a gear segment 124 formed on the cam 67 located in the slot 64 of housing 2, the idler 122 likewise being located in said slot 64 of housing 2.

It can thus be seen that upon reciprocation of rack 116 by the piston 114, idler gear 122 will be rotated and will cause rotation of cam 67 located in housing 2 and through cam shaft 68 the simultaneous rotation of cam 67 in housing 3 for swinging the cradle 60 and actuating the cutting tools 77 as described.

Hydraulic operating and control mechanism

Noting particularly Figure XXV, the source of power for operating the hydraulic system is derived from the electric motor 125 mounted on the bracket 126 on the left hand side of the base 1 (Figure VIII) which drives the low-pressure high-volume fluid pressure pump 127 and the high-pressure low-volume fluid pressure pump 128 which pump fluid from the storage tank 129 through line 130. To the exhaust port of pump 127 is applied a relief valve 131 and to the exhaust port of pump 128 is applied a relief valve 132, both of said valves being connected into the main discharge line 133 and having their discharge flows emptying into the drain line 134 by appropriate arrangements in the valve housing 135. The relief valve 132 is set at a relatively higher pressure than relief valve 131. Connected to the line 133 is a pressure regulating valve 136 which at all times maintains a substantial minimum pressure in the line 133 at a pressure below the pressure setting of either of the relief valves 131 and 132. Thus pressure is at all times properly maintained in line 90 to render the vibration dampening mechanism comprising the cylinder 83 and its accessories effective. The discharge port 137 of valve 136 is connected through line 138 to the inlet port 139 of the main control valve 140. The pressure reducing valve 141 is connected to the valve 136 and thereby directly to the line 133 through line 142 and is set for the same pressure as valve 136 whereby fluid pressure is at all times supplied to line 143 at a pressure equal to the pressure settings of valves 136 and 141. A line 144 connecting with line 143 conducts the fluid pressure to the control valve 145 for controlling the clamping mechanism for the chucks 48 on the upper spindle and to the control valve 146 for the chucks 48 on the lower spindle.

In the operation of the lathe the crankshafts are placed in the chucking devices and the steady rests 50 closed over the line bearings. The chucking control valves 145 and 146 are then manipulated so that fluid pressure from line 144 is transmitted through lines 147 to the chambers 148 of the chucking cylinders 149 of the work spindles 49 to thereby actuate the gripping mechanism of chucks to hold the work therein, the chambers 150 of said cylinders 149 being connected through line 151 through the valves 145 and 146 to the drain line 152 whereby fluid may escape therefrom and return to the tank 129.

After having thus properly chucked the work in the lathe the main drive motor 102 is set in motion for rotating the spindles 49 and master crankshafts 51 and 58 by actuating the starting handle 153 of the master starting and inching switch 154 (Figures I, IX, X, and XIII). The feed control handle 155 is then moved to the left (Figures I and XXV) to forward feed position to actuate the valve 140 through suitable linkage 156 and plunger 157 so that fluid pressure is caused to flow from line 138 into line 158 communicating with the chamber 159 of cylinder 113 raising the piston 114 and thereby upwardly moving the rack 116 to rotate the feeding cams 67 to move the cutting tools T toward the work as described. A spring 160 connected to the cam plate arm 161 of the lever 155 normally yieldingly urges the lever 155 to the right. On the rack 116 is fixed a cam plate 162 which travels upward with the rack when the lever 155 is moved to the left, the arm 161 of said lever 155 having a pin 163 engaging the cam slots of said cam plate. It can thus be seen that upon moving the lever 155 to the left the pin 163 will be brought in alignment with the forward feed cam slot 164 in cam plate 162 and will be held therein upon upward movement of the rack 116 to thereby relieve the operator of the necessity of holding said lever 155 to maintain feeding motion.

The rate of upward movement of piston 114 under the influence of fluid pressure 159 is determined by the rate of escape of fluid permitted from chamber 165 of cylinder 113. When it is desired to move the piston 114 upward at forward feeding rates fluid is allowed to escape from chamber 165 through lines 166 and 167 to the adjustable metering or feed rate control valve 168 from which valve 168 the fluid escapes at a relatively slow rate through line 169, into valve 140, and then through the drain line 170 to discharge into the tank 129. The rapid traverse control valve 171 is connected to the lines 166 and 167 through line 172 and through line 173 to the line 169. The rapid traverse valve 171 is so constructed that its plunger 174 is normally urged upward (Figure XXV) to prevent flow of fluid from lines 172 to 173 and to at all times permit free flow of fluid from lines 173 to 172.

During forward feeding movements the rapid traverse valve 171 has its plunger 174 upwardly extended thereby preventing flow from line 172 to 173 thus closing off line 172. The metering valve 168 causes back pressure to be built up in chamber 165 and thus pressure in chamber 159 sufficiently high to cause the high pressure relief valve 132 to open, and therefore likewise the low pressure relief valve 131 and the pressure reducing valve 136 to discharge into line 138. The opening of the low pressure relief valve 131 allows the flow from the low-pressure high volume pump 127 to escape through the drain line 134 so that this pump is ineffective to actuate the piston 114. The high-pressure low-volume pump 128 exhausts all surplus fluid not needed in chamber 159 for feeding movement past relief valve 131 and valve 136 thus actuating the piston 114 at feeding rates under high pressure to give a smooth and powerful feed to the cutting tools T.

When it is desired to actuate the cutting tools in rapid traverse toward the work the plunger 174 of the rapid traverse valve 171 is depressed connecting line 172 to line 173 whereby fluid is allowed to freely escape from chamber 165 of cylinder 113 through lines 166 and 172, valve 171, lines 173 and 169, valve 140, and line 170 into the tank 129. Pressure under these circumstances is substantially removed from chamber 165, so that the only pressure in chamber 159 and lines 158 and 138 being that to freely move the cutting tools at rapid traverse speed toward the work, a pressure usually much less than the pressure setting of the valve 136. It can thus be seen that were it not for the valves 136 and 141 pressure in lines 133 and 143 would drop below a safe operating pressure for the cylinder 83 and the chucking cylinders 149. Since the pressure in chamber 159 is thus below the setting of valve 136 in forward rapid traverse and therefore below the settings of valves 131 and 132, the pumps 127 and 128 therefore do not discharge through their respective relief valves 131 and 132 but transmit both of their flows through valve 136 to chamber 159 giving ample volume of flow at relatively low pressure to rapidly raise the piston 114 at rapid traverse rates.

As the cutting tools reach the end of their dwell period the rack 116 and cam plate 162 have traveled upward to a point where the pin 163 rides off the edge 175 of cam slot 164 and the arm 161 and its lever 155 are drawn to the right by spring 160 until the pin 163 engages the face 176 of the rapid traverse return slot 177 whereupon the valve 140 is shifted through the linkage 156 and plunger 157 so that the fluid may flow freely from line 138 through lines 169 and 173, rapid traverse valve 171, and lines 172 and 166 into chamber 165 of cylinder 113. The chamber 159 is then connected through line 158, valve 140, and line 170 to the tank 129 relieving substantially all back pressure from chamber 159. Thus as in the case of forward rapid traverse both pumps 127 and 128 deliver their flow through valve 136 to chamber 165 supplying ample volume at low pressure to return the piston 114 downwardly at rapid traverse speed. As the cam plate is returned downward the angular portion 177a of cam slot 177 engages pin 163 and thereby moves the plunger 157 to an intermediate or neutral position thereby discontinuing further rapid traverse return pressure in chamber 165 and to hold the tools T in retracted position.

In connection with the forward rapid traverse movement I have provided a novel arrangement whereby said rapid traverse is rendered operative or inoperative at the proper time both manually and automatically as desired. The mechanism is particularly shown in Figures I, XIV, XV, and XXV, and comprises a vertically arranged rod 178 which is connected at its lower end to the plunger 174 of the rapid traverse valve 171 and connected at its upper end to the yoke 179 which member has a slot 180 extending axially of rod 178 and nicely fitting about the bearing portion 181 of the end of the cam shaft 68 where it projects from the left hand side of housing 2 whereby the upper end of rod 178 is supported and allowed vertical reciprocating movement.

A manual rapid traverse control handle 182, conveniently located at the front of the lathe (Figure I) is connected to a hub portion 183 rotatably mounted on the bearing portion 184 of the cam shaft 68 between the housing 2 and yoke 179 having a lug 185 in which is fixed a pin 186 adapted to engage a lug 187 of the yoke 179 so that when lever 182 is pulled down the rod 178 will likewise be moved downward to actuate the valve 171 for forward rapid traverse, the rod 178 and lever 182 being returned upward by the normal upward movement of the plunger 174 of the valve 171 when said lever 182 is released.

Automatic means are provided for actuating the rapid traverse valve 171 at appropriate times during the forward tool movement comprising a cam 188 clamped to the portion 181 of cam shaft 68 by suitable clamping means 189 which has a projecting portion 189a adapted to engage one or the other of the rollers 190 and 191, rotatably mounted on studs 192 fixed in the yoke 179, the cam 188 also serving to axially confine the yoke 179 and hub 183 on the cam shaft 68. It can thus be seen that since the cam 188 is clamped on the cam shaft 68 it will rotate in synchronism with the feeding cams 67 and that by properly circumferentially locating the portion 189 about the cam shaft 68 and relative to the cams 67 the cam 188 can be caused to contact the roller 190 to move rod 178 downward to actuate valve 171 for forward rapid traverse or to release said roller and allow upward travel of the rod 178 and the closing of valve 171 to discontinue rapid traverse forward at the desired portion of the forward feeding movement. In order to prevent manual actuation of the valve 171 at certain portions of the feeding cycle the cam 188 has its projecting portion 189 adapted to rotate under the roller 191 to automatically cut off rapid traverse forward in the event the manual lever was being held down too long or at the wrong portion of the feeding cycle and also to prevent any further manual operation at this stage.

*Lubricating system*

A unique and unusual lubricating system is provided for the lathe and is particularly illustrated in Figures VIII, IX, X, XIII, XIXa, XXIII, XXIV, and XXV. The source of supply of lubricant for the lubricating system is derived directly from the hydraulic feed and rapid traverse system and is delivered to the lubricating system under pressure. Noting Figures XXIII, XXIV, and XXV, lubricant is received from line 143 through line 193 and passes through a suitable filter 194 located in the bracket 195 attached to the main control valve 140 and through the passages 196, 197, 198, 199, and 200 in said bracket to the outlet pipe 201. The plunger 157 of valve 140 is nicely fitted for axial movement in bore 202 in the bracket 195 and has an annular groove 203 adapted to be aligned with passages 198 and 199 when the plunger 157 is set for rapid traverse return position. It can thus be seen that whenever the machine is operating the cutting tools in rapid traverse return, lubricant under pressure is supplied from the hydraulic pressure system to the lubricating system. It is also to be noted that the operator may at any time when the tools are at rest in retracted position move the plunger 157 from neutral position to rapid traverse reverse position to lubricate the machine before commencing a machining cycle, the lever 155 and plunger 157 being disengageable from the arm 161 in a usual manner as set forth in Figure 14 of Patent Re. 18,662 issued Nov. 22, 1932.

Lubricant passes through line 201 into the distributing frame comprising the pipes 204, 205, and 206 which frame is mounted on top the machine by suitable bolts 207 passing through the lower ends of the pipes 204 and 206 into the top surfaces of housings 2 and 3. Lubricating lines 208 in each of the pipes 204 and 206 lead directly to various bearings, etc., of the working parts of the machine whereby lubricant under pressure is furnished directly to these parts of the machine from the hydraulic pressure system. Suitable pressure maintaining valves 209 are provided in each line 208 to maintain proper pressure in pipes 204 and 206 and to provide the proper amount of lubricant for each line 208.

In pipe 205 is also located a series of pressure maintaining valves 209 which discharge into the various pockets 210 to 220, inclusive, in the top of the cradle 60 (best shown in Figures IXa, XIXa, and XXIII) the proper amounts of lubricant and also maintain proper pressure in pipe 205. The structure of the pockets in the cradle 60 is quite unique in that it provides means to distribute lubricant to all working parts of the cradle while at the same time providing a series of box-like sections forming a rigid structure bridging the master crankshaft 58 and greatly assisting the ribs 70a and webs 70b to form an extremely rigid unitary structure for the cradle.

The pockets 210 and 220 communicate through passages 221 (Figure XIII) with the main bearing 59 of the upper master crankshaft 58 and pockets 211 and 219 communicate through passages 222 with the roller 65 on stud 66. The pockets 212, 213, 215, 217, and 218 communicate lubricant through passages 223 (Figure X) which drip lubricant into pockets 224 in the linkage connection 79 which in turn communicate through passages 225 with the crank pin bearings of the linkage connections 79. The pockets 214 and 216 communicate through passages 226 (Figure IX) to the intermediate bearings 71 of the master crankshaft 58. All surplus lubricant discharged from the bearings and cooperating parts of the upper master crankshaft 58 is caught in the depressed portion 70c (Figure X) of the web 70b below the master crankshaft and is drained therefrom through passages 227 into lubricant receiving cavities 228 formed in the top front portions of the orbitally moving tool carrier units 75 from which lubricant is delivered to the hardened side plates 229 through passages 230; to the hardened side plates 231 through passages 232; and to the lower master crank pins 78 through passages 233, surplus oil from these pin bearings escaping and providing sufficient lubrication for side plates 234. Thus it is seen that all working parts associated with the cradle mechanism receive an adequate supply of lubricant, all other working parts of the lathe being lubricated from the lines 208 extending from pipes 204 and 206 to thereby provide a very efficient and dependable lubricating system for the entire mechanism.

The coolant supply for the cutting tools 77 is pumped from the coolant chamber 10 in base 1 by the centrifugal pump 235 fixed on the rear of the base 1 and driven by the usual electric motor 236 (Figure VIII) the coolant being discharged into the manifold 237 from which lead flexible conduits 238 communicating with coolant passages 239, 240, 241, and 242 in the tool carrier units 75 from which the coolant discharges on the tools and work through appropriate nozzles 243.

Electric operating and control mechanism

The work spindles of the lathe may be caused to rotate at constant speed, a plurality of different speeds, or at variable speed during the operating cycle of the lathe by appropriately operating the main drive motor 102.

To operate the work spindles at constant speed the handle 153 of the master switch 154 is moved to extreme left or "start" position 244 (Figures I, XXVI, XXVII, and XXVIII) to energize appropriate relays for full load starting of motor 102. The handle 153 then automatically returns part way to "run" position 245 for normal operation of motor 102. However, the motor 102 will not start unless the cover 107 (Figures XIX and XX) has been closed over the capstan head 105 to allow the limit switch 110 (Figure XXVII) to operate appropriate relays to form contact between the main power lines 102a and motor 102. Furthermore, I have provided an additional safety feature which prevents the operation of motor 102 when the work has not been properly clamped in the chucking devices. This arrangement is particularly shown in Figures I, III, and XXIII and comprises a bar 246 pivotally connected to the plungers 247 and 248 of the control valves 145 and 146 respectively for the chucks 48, the bar having a projection 249 adapted to engage a roller 250 to actuate the limit switch 251 fixed on the housing 2. The limit switch 251 is so arranged that when the roller 250 is released of contact with projection 249 (as shown in Figure XXIII) appropriate relays are operated to prevent operation of motor 102. As shown in Figure XXIII both valves 145 and 146 are in "off" or unclamped position for loading or removing work from the chuck. The bar 246 is so arranged relative to the limit switch 251 that the motor 102 may only be operated when both valves are moved to "on" or clamping position of the chucks.

At the completion of the forward feeding movement of the cutting tools T the handle 153 of master switch 154 is returned to "stop" position 252 by actuation of the lever 155 by cam plate 162 substantially as described in Patent Re. 18,-662 and particularly shown in Figures 1, 4, 11, 13, and 14 thereof, whereupon all power is removed from motor 102, the motor and associated lathe mechanism coasting until the cam 253 (Figures XXI and XXII) fixed to one of the spindle gears 98 strikes the roller 254 and actuates the arm 255 of limit switch 256 whereupon power is reversed to motor 102 to provide dynamic braking of motor 102. The limit switch 256 is mounted on the frame of the lathe, for example, on base 1 by means of a suitable bracket 257 which has means 258 whereby said switch 256 may be adjusted tangentially of the periphery of the gear 98. A zero speed switch 259 (Figures XIX, XX, and XXVI) is mounted on the bracket 189 and is driven by the outer extension 260 of the motor shaft 104 so that at the instant the motor 102 comes to a stop under the reverse dynamic braking power the dynamic braking power will be disconnected, leaving the motor 102 and the work spindles in stopped position. The purpose of the switches 256 and 259 is to provide means whereby the spindles and their chucks may be automatically stopped in a definite circumferential position to facilitate loading and unloading work in the chucks. It has been found that the time required from the instant of applying dynamic braking power to the motor 102 comes to a stop is substantially constant. Therefore, if the dynamic braking power is applied at a definite circumferential position of the chucks or the spindle gear 98 associated therewith the chucks can be automatically stopped in a definite circumferential position. The tangential adjustment is provided for limit switch 256 to provide means for adjusting the circumferential stopping position of the chucks.

When it is desirable to operate the work spindles at a plurality of different speeds, for example at a high speed and a low speed during the cutting cycle, I provide mechanism particularly shown in Figures XI, XII, and XXVI. The motor 102 is provided with a high speed winding 261 and a low speed winding 262 one or the other of said windings being rendered operative by means of the two way limit switch 263 mounted on the front of the housing 2 and having its operating plunger 264 connected to the rock bar 265 carrying the actuating rollers 266 and 267. The rollers 266 and 267 are adapted to be contacted by appropriately arranged dogs 268 and 269 fixed on the rack 116 to actuate the switch whereby the motor 102 may be actuated for high speed or low speed upon movement of the rack 116 for various predetermined positions of tool feed travel.

I have further provided mechanism whereby the work spindles may be driven at variable speed and in a predetermined relation to the various stages of the cutting cycle. Noting particularly Figures I, XVII, XVIII, and XXVIII, this mechanism comprises a field rheostat 270 mounted on the right hand housing 3 having the usual contact buttons 271 and the contact arm 272. The arm 272 is adapted to be rotated by and in a definite relation to the cam shaft 68 by means of the sprocket 273 fixed on the cam shaft 68 which drives the sprocket 274 attached to the arm 272 through the chain 275. It can thus be seen that upon rotating the cam shaft 68 and the cams 67 the rheostat 270 will likewise be operated in a definite time relation to said cams 67.

A still further arrangement is that shown in Figure XXVII wherein a multiple contact drum switch 276 is mounted and driven substantially as the rheostat 270 whereby a multiplicity of different speeds are produced for operating the motor 102 at various predetermined speeds by said switch 276. For example, the contacts 277 might be arranged to cause the motor 102 to operate at slow speed, medium speed, high speed, and then slow speed during the cutting cycle of the lathe.

Methods of operation

Machines embodying the principles described above are very versatile in their application to the turning of the crank pins and associated surfaces of crankshafts.

One method of operation is that shown in Figures II and IV wherein a series of cheeking tools 77a are mounted in the tool holders 76 and adapted to machine the cheek F of the webs W adjacent the crankpins P of the crankshafts 27. The tools 77a are fed radially toward the crank pins P to machine the cheek F to the rough diameter P' of the crank pins (Figure IV). When machining these portions of the crankshafts the cycle of operations is substantially as follows: Noting particularly Figures XVI and XVII (arrows 280 and 281) in retracted position, the tool 77a is at position A, the cradle rollers 65 contacting cams 67 at point A, and the variable speed rheostat arm at position A. The spindles are started and the hydraulic feed applied as described whereupon the tools 77a rapid traverse to position B (or travel from A to B under coarse feed in instances where the web projects sufficiently far to make rapid traverse unnecessary). The cams 67 are rotated during this movement bringing rollers 65 in contact at point B. The tools 77a are then actuated at a coarse feed rate until point D is reached whereupon they are returned immediately in rapid traverse to starting point A, no dwell from D to E being necessary in this operation as no accurate diameter must here be finished. During the movement from A to D the rheostat arm 272 advances over the buttons 271 to gradually increase the speed of rotation of the work piece to automatically maintain a constant cutting speed of the tool on the work thereby effecting a great saving of time and adding increased life to the cutting tools 77a. In cases where it is desirable to use a motor 102 of a type which cannot be regulated through a variable speed range, the multiple speed switch 277 (Figure XXVII may be used in a like manner to the rheostat 270 to maintain approximate constant cutting speed.

In certain instances the crankshaft web W is cleared or formed along the lines 278 and 279 (Figure XVI) thereby eliminating the machining on this outer portion of the cheek F. The tools 77a are in this case rapid traversed from A to B' automatically before coarse feed movements begin (arrows 282 and 283, Figures XVI and XVII). Also in cases where the line 279 cannot be accurately maintained in the original forming of the crankshaft the manual rapid traverse lever 182 may be used to traverse the tools 77a until they strike the line 279 of the work, thereby greatly saving the time required if the rapid traverse was set to accommodate the surfaces 279 furthest radially removed from the axis of turning of the work piece.

Another method of operation is that shown in Figures III and IVa wherein a series of crank pins of previously cheeked crankshafts are simultaneously turned to accurate dimensions. Cutting tools 77b are fed toward the crank pin P removing the portion P' and finishing the pin P to proper width. When machining these portions of the crankshafts the cycle of operation is substantially as follows: Noting particularly Figure XVII (arrows 284 and 285) the tools 77b are rapid traversed from starting position A to position C whereupon the tools are fed at fine feed from C to D, and held in dwell D and E position while cam 67 continues to rotate from D to E for sizing the crank pin diameter, and then rapid traversed from E to starting position A. As the tools are fed from C to D the work spindles are rotated at relatively high speed to cause rapid removal of material at fine feed rate, effecting great saving in time. Upon reaching point D the cam 268 on rack 116 trips the limit switch 264 to cause the spindles to rotate at relatively slow speed for accurate finish of the pin P without chatter or other defects which would result if the high speed was used for this part of the cutting cycle. With slight modifications of the cutting tools the machine may be arranged to rough turn the pins P on one spindle while at the same time the other spindle has its tools arranged to finish turn the crank pins of a crankshaft previously roughed out on the lower spindle thus combining the machining operations in a single machine which formerly required two or more machines heretofore.

Still another method of machining crankshafts comprises machining the cheeks F of the webs W on one spindle while at the same time turning the crank pins P of a crankshaft on the other spindle which has been previously cheeked on said first mentioned spindle. Thus, by this arrangement the simultaneous cheeking and pin turning can be done on different spindles in a single machine to thereby completely finish the crank pins and associated surfaces. When cheeking is done on one spindle and pin turning on the other, the cheeking tools partake of a movement as shown by arrows 286, 287, and 288 of Figures XVI and XVII wherein tools 77a feed from A to B at rapid traverse, from B to C at coarse feed at which point the pin turning tools 77b begin to cut and therefore the tool carriers 75 must be actuated at fine feed and dwell for completing the crank pin, the tools 77a likewise feeding in this manner to simultaneously complete the cheeking operation. The variable speed or multiple speed arrangement in this arrangement is provided to properly accommodate both types of machining operations. For instance in this arrangement, the spindles commence rotation at slow speed at starting position A and increase in speed until position C is reached to maintain constant cutting speed for the cheeking tools 77a, the spindles then continue operating at high speed while tools feed from C to D to rough out the pin P and complete the cheeking, at D the spindles drop back to slow speed from D to E for finishing the crank pin diameters.

A still further method of machining crankshafts which may be carried out is shown for example in Figures V and Va wherein both cheeks each side of a crank pin P may be simultaneously machined on one spindle by tools 77a while at the same time the crank pin P is machined on a crankshaft on another spindle which has been previously cheeked on the first mentioned spindle.

Another method would be that shown in Figures VI and VIIa wherein the web W is cheeked and its associated pin turned by tool 77c on one spindle while at the same time the pin on another crankshaft previously turned in the first mentioned spindle is finished to accurate length and the fillets 289 formed on the pin to facilitate subsequent finish grinding operations.

My invention is also adapted to machining crankshafts wherein part of the surface of a crank pin is completely machined on one spindle while simultaneously the remaining portion of another crankshaft so machined on said spindle is being machined on another spindle. For example in Figures VII and VIIa the tools 77e machine the webs W and portions of the crank pin P while at the same time the tool 77b finishes the portion of the crank pin P left by tools 77e and trues up the diameter of said crank pin P.

Having fully set forth and disclosed my invention what I claim is:—

1. In a lathe, means for chucking and rotating a plurality of work pieces from the ends thereof, steady rest means for supporting said work pieces intermediate said chucking and rotating means, and tool feeding devices arranged between said chucking and rotating means and between said steady rest means for feeding appropriate cutting tools relative to said work pieces.

2. In a lathe, means for chucking and rotating a plurality of work pieces from the ends thereof, spaced steady rest means for supporting said work pieces at a plurality of axially spaced positions of said work pieces intermediate said chucking and rotating means, and tool feeding devices arranged between said chucking and rotating means and between said steady rest means for simultaneously feeding appropriate cutting tools relative to said work pieces.

3. In an orbital lathe adapted to machining the crank pins and associated surfaces of crankshafts, means for chucking and rotating a plurality of crankshafts from the ends thereof, steady rest means for supporting said crankshafts at a plurality of axially spaced intermediate positions between said chucking and rotating means, tool feeding devices located between and each side of said steady rest means, and means to actuate said tool feeding devices to feed appropriate cutting tools relative to the crank pins and associated surfaces of said crankshafts.

4. In an orbital lathe adapted to machining the crank pins and associated surfaces of multi-throw crankshafts having a plurality of intermediate line bearings, means for chucking and rotating a plurality of crankshafts from the ends thereof, steady rests for supporting said crankshafts about their intermediate line bearings, tool carrier units located between and each side of said steady rests, cutting tools mounted on said units, and means for actuating said tool carrier units so as to cause relative feeding of said tools and said crank pins and associated surfaces of said crankshafts.

5. In an orbital lathe adapted to machining the crank pins and associated surfaces of six-throw four-line bearing crankshafts, means for chucking and rotating a plurality of said crankshafts from the ends thereof, steady rests for the intermediate line bearings of said crankshafts, a tool carrier unit located between said steady rests, tool carrier units located each side of said steady rests, cutting tools mounted on said tool carrier units, and means for actuating said tool carriers so as to cause relative feeding of said tools and said crank pins and associated surfaces of said crankshafts.

6. In an orbital lathe adapted to machining the crank pins and associated surfaces of eight-throw five-line bearing crankshafts, means for chucking and rotating a plurality of said crankshafts from the ends thereof, steady rests for the intermediate line bearings of said crankshafts, tool carrier units located between and each side of said steady rests, cutting tools mounted on said tool carrier units, and means for actuating said tool carriers so as to cause relative feeding of said tools and said crank pins and associated surfaces of said crankshafts.

7. In a multiple spindle orbital lathe, a frame, a plurality of rotatable work spindles in said frame, a master crankshaft rotatably mounted in said frame, a feeding cradle pivotally mounted about the axis of rotation of said master crankshaft, a second master crankshaft rotatably mounted in said cradle, means for rotating said master crankshafts and work spindles in synchronism, tool carrier units mounted on the crank pins of said master crankshafts, cutting tools on said tool carrier units, and means for swinging said cradle to cause relative feeding of said tools and work in said work spindles.

8. In an orbital lathe, a frame, rotatable work holding means in said frame, steady rest units mounted on said frame between said work holding means, a master crankshaft rotatably mounted in said frame and steady rest units, a feeding cradle pivotally mounted about the axis of rotation of said master crankshaft, a second master crankshaft rotatably mounted in said cradle, means for rotating said master crankshafts and work holding means in synchronism, tool carrier units mounted on the crank pins of said master crankshafts, cutting tools on said tool carrier units, and means for swinging said cradle to cause relative feeding of said tools and work in said work holding means.

9. In a multiple spindle orbital lathe, a frame, a plurality of work spindles in said frame, a master crankshaft rotatably mounted in said frame, means for moving a second master crankshaft about the axis of rotation of said first mentioned master crankshaft comprising a cradle having a structural section for rotatably supporting said second master crankshaft free from distortion and integral pivot arms journaled about the axis of rotation of said first mentioned master crankshaft, and means for actuating said cradle in swinging movement relative to said work spindles.

10. In a multiple spindle orbital lathe, a frame, a plurality of work spindles in said frame, a master crankshaft rotatably mounted in said frame, means for moving a second master crankshaft about the axis of rotation of said first mentioned master crankshaft comprising a cradle having a structural section for rotatably supporting said second master crankshaft and integral pivot arms journaled about the axis of rotation of said first mentioned crankshaft, and cam means mounted in said frame engaging said structural section to cause swinging movement of said cradle relative to said work spindles.

11. In an orbital lathe, a frame, a master crankshaft rotatably mounted in said frame, means for moving a second master crankshaft about the axis of rotation of said first mentioned master crankshaft comprising a cradle having a structural section for rotatably supporting said second mentioned master crankshaft and integral pivot arms journaled about the axis of rotation of said first mentioned crankshaft, a cam shaft journaled in said frame, peripheral cams mounted on said cam shaft contacting said cradle, and means for rotating said cam shaft whereby said cradle may be actuated in swinging movement.

12. In an orbital lathe, a frame, a master crankshaft rotatably mounted in said frame, means for moving a second master crankshaft about the axis of rotation of said first mentioned master crankshaft comprising a cradle having a structural section rotatably supporting the end line bearings and also the intermediate line bearings of said second master crankshaft and integral pivot arms journaled about the axis of rotation of said first mentioned master crankshaft, and means for actuating said cradle in swinging movement.

13. In an orbital lathe, means to cause a tool carrier unit to move in an eccentric path comprising a pair of eccentrics, on one of which eccentrics the unit is directly journaled and to the other of which eccentrics the unit is connected by a mounting element comprising a linkage connection journaled on said second mentioned eccentric and pivotally connected to said unit by a cylindrical boss and socket connection.

14. In an orbital lathe, a frame, a master crankshaft rotatably mounted in said frame, means for moving a second master crankshaft about the axis of rotation of said first mentioned crankshaft comprising a cradle rotatably supporting said second master crankshaft and pivotally mounted about the axis of rotation of said first mentioned master crankshaft, actuating means for swinging said cradle, and resilient means associated with said cradle opposing said actuating means.

15. In an orbital lathe, a frame, a master crankshaft rotatably mounted in said frame, means for moving a second master crankshaft about the axis of rotation of said first mentioned crankshaft comprising a cradle having a structural section rotatably supporting said second mentioned crankshaft and integral pivot arms journaled about the axis of rotation of said first mentioned crankshaft, cam means for actuating said cradle in swinging movement, and hydraulically operated means mounted on the frame of the lathe and cooperating with said cradle to yieldingly oppose said cam means.

16. In a lathe, a rotatable work spindle, an electric motor for rotating said spindle, a source of electric power, switching mechanism for connecting or disconnecting said electric power from said motor, a capstan head fixed on the shaft of said motor, bar means insertable in said capstan head for manual rotation of said motor, and means to prevent insertion of said bar means in said capstan head when electric power is applied to said motor.

17. In a lathe, a rotatable work spindle, an electric motor for rotating said spindle, a source of electric power, switching mechanism for connecting or disconnecting said electric power from said motor, a capstan head fixed on the shaft of said motor, bar means insertable in said capstan head for manual rotation of said motor, a cover engageable over said capstan head or removable therefrom, and a limit switch engageable by said cover when removed from said capstan head for rendering said switching mechanism effective and for rendering said switching mechanism ineffective when said cover is disengaged from said limit switch and engaged over said capstan head.

18. In a lathe, tool feeding devices movable relative to work in said lathe, means for actuating said devices comprising a fluid pressure cylinder, a piston movable in said cylinder and connected to said tool feeding devices, means for moving said piston comprising a low-pressure high-volume fluid pressure pump, a high-pressure low-volume fluid pressure pump, means for simultaneously driving said pumps, a fluid supply connected to said pumps, a high pressure relief valve connected in the exhaust line of said high-pressure pump, a lower-pressure relief valve connected in the exhaust line of said low-pressure pump, a pressure regulating valve connected to both of said pumps and set at a lower pressure than either of said relief valves, and means for conducting fluid pressure from said pressure regulating valve to said cylinder.

19. In a lathe, tool feeding devices movable relative to work in said lathe, means for actuating said devices, and means to yieldingly oppose said actuating means, said actuating means comprising a fluid pressure cylinder, a piston movable in said cylinder and connected to said tool feeding devices, means for moving said piston comprising a low-pressure high-volume fluid pressure pump, a high-pressure low-volume fluid pressure pump, means for simultaneously driving said pumps, a fluid supply connected to said pumps, a high pressure relief valve connected in the exhaust line of said high-pressure pump, a lower-pressure relief valve connected in the exhaust line of said low-pressure pump, a pressure regulating valve connected to both of said pumps and set at a lower pressure than either of said relief valves, and means for conducting fluid pressure from said pressure regulating valve to said cylinder, said opposing means comprising fluid pressure operated means to yieldingly urge said tool feeding devices against said actuating means, and means connected to said relief valves to conduct fluid pressure therefrom to render said fluid pressure operated means effective.

20. In a lathe, fluid pressure operated chucking devices, tool feeding devices movable relative to work held in said chucking devices, means for actuating said tool feeding devices, comprising a fluid pressure cylinder, a piston movable in said cylinder and connected to said tool feeding devices, means for moving said piston comprising a low-pressure high-volume fluid pressure pump, a high-pressure low-volume fluid pressure pump, means for simultaneously driving said pumps, a fluid supply connected to said pumps, a high pressure relief valve connected in the exhaust line of said high-pressure pump, a lower-pressure relief valve connected in the exhaust line of said low-pressure pump, a pressure regulating valve connected to both of said pumps and set at a lower pressure than either of said relief valves, a second pressure regulating valve connected to said pumps and set at substantially the same pressure as said first mentioned pressure regulating valve, means for conducting fluid pressure from said first mentioned pressure regulating valve to said cylinder, and means for conducting fluid pressure from said second pressure regulating valve to said chucking devices.

21. In a lathe, tool feeding devices reciprocatable relative to work in said lathe, means for actuating said devices comprising, a fluid pressure cylinder, a piston reciprocatable in said cylinder and connected to said tool feeding devices, means for moving said piston comprising a low-pressure high-volume fluid pressure pump, a high-pressure low-volume fluid pressure pump, means for simultaneously driving said pumps, a fluid supply connected to said pumps, a high pressure relief valve connected in the exhaust line of said high-pressure pump, a lower-pressure relief valve connected in the exhaust line of said low-pressure pump, a pressure regulating valve connected to both of said pumps and set at a lower pressure than either of said relief valves, means for alternately connecting fluid pressure from said pressure regulating valve to one or the other of the cylinder chambers for reciprocation of said piston.

22. In a lathe, tool feeding devices movable relative to work in said lathe, means for actuating said devices comprising, a fluid pressure cylinder, a piston movable in said cylinder and connected to said tool feeding devices, a source of fluid pressure for moving said piston in said cylinder, means creating a back pressure against said piston to limit its rate of travel, means to render said back pressure creating means effective or ineffective, and combined manual and automatic means to operate said last mentioned means.

23. In a lathe, tool feeding devices movable relative to work in said lathe, means for actuating said devices comprising a fluid pressure cylinder, a piston movable in said cylinder and connected to said tool feeding devices, a source of fluid pressure for moving said piston in said cylinder, means creating a back pressure against said piston to limit its rate of travel, means to automatically render said back pressure creating means effective or ineffective at predetermined stages of travel of said piston, and manual means to render said back pressure creating means effective or ineffective.

24. In a lathe, tool feeding devices movable relative to work in said lathe, means for actuating said devices comprising, a fluid pressure cylinder, a piston movable in said cylinder and connected to said tool feeding devices, a source of fluid pressure for moving said piston in said cylinder, means creating a back pressure against said piston to limit its rate of travel, means to automatically render said back pressure creating means effective or ineffective at predetermined stages of travel of said piston, and manual means, partially under control of said automatic means, to render said back pressure creating means effective or ineffective at certain stages of travel of said piston.

25. In a crankshaft lathe, means for moving cutting tools at rapid traverse and feeding speeds to machine the cheeks of the webs of a crankshaft, automatic means to cause rapid traverse and feeding movements of said cutting tools in a predetermined sequence, and manual means for effecting a greater amount of rapid traverse movement than that caused by said automatic means.

26. In a crankshaft lathe, means for moving cutting tools at rapid traverse and feeding speeds to machine the cheeks of the webs of a crankshaft, automatic means to cause rapid traverse and feeding movements of said cutting tools in a predetermined sequence, and manual means for effecting a greater amount of rapid traverse movement than that caused by said automatic means, said automatic means determining the amount to which said rapid traverse movement may be increased.

27. In a lathe, fluid pressure operated tool feeding devices, a source of fluid pressure for operating said devices, a lubricating system for the working parts of said lathe, said lubricating system being supplied with lubricant under pressure derived from said source of fluid pressure for operating said tool feeding devices, and means for connecting or disconnecting said lubricant supply from said lubricating system at a predetermined stage of operation of said lathe.

28. In a lathe, fluid pressure operated tool feeding devices, a source of fluid pressure for operating said devices to and from work in said lathe, control means for said source of fluid pressure, a lubricating system for the working parts of said lathe, said lubricating system being supplied with lubricant under pressure derived from said source of fluid pressure, and means in conjunction with said control means to cause lubricant to be supplied to said lubricating system when said control means is actuated.

29. In a lathe, hydraulically actuated tool feeding devices, a source of fluid pressure for moving said devices to and from work in said lathe, control means for said source of fluid pressure to effect said to and from movement, a lubricating system for the working parts of said lathe, said lubricating system being supplied with lubricant under pressure derived from said source of fluid pressure, means operating in conjunction with said control means to cause lubricant to be supplied to said lubricating system when said control means is actuated to cause movement of tool feeding devices from said work.

30. In a lathe, hydraulically actuated tool feeding devices, a source of fluid pressure for actuating said devices, a lubricating system receiving lubricant under pressure from said source of fluid pressure comprising, a distributing frame, and lubricant conducting means from said frame for distributing lubricant under pressure to the various bearings and working parts of said lathe.

31. In a lathe, hydraulically actuated tool feeding devices, a source of fluid pressure for actuating said devices, a lubricating system receiving lubricant under pressure from said source of fluid pressure comprising, a distributing frame, pressure maintaining outlets in said frame, conduits leading from some of said outlets whereby lubricant under pressure may be delivered to certain of the working parts of said lathe, and conduits leading from others of said outlets whereby other of the working parts of said lathe are lubricated by gravity.

32. In an orbital lathe, a frame, a master crankshaft rotatably mounted in said frame, means for moving a second master crankshaft about the axis of rotation of said first mentioned master crankshaft comprising a cradle having a structural section for rotatably supporting said second master crankshaft, said section also having a lubricant distributing means for working parts of the lathe, and integral pivot arms journaled about the axis of rotation of said first mentioned crankshaft, and lubricant supply means for said lubricant distributing means.

33. In a multiple spindle lathe, fluid pressure operated chucking devices on the spindles of said lathe, means for rotating said spindles, a limit switch operable to render said rotating means effective or ineffective, fluid pressure means for operating said chucking devices, a control means for said fluid pressure means for the chucking devices on each spindle, and means associated with said control means to actuate said limit switch so that said rotating means is rendered ineffective when any or all of said control means are actuated to operate said chucking devices to unclamping position.

34. In a lathe having a plurality of rotatable work spindles, means for rotating said work spindles, chucking devices adapted to radial loading and unloading of work therein mounted on said spindles, and means for automatically stopping rotation of said spindles at a definite predetermined circumferential position to facilitate loading and unloading work in said chucking devices.

35. In an orbital crankshaft lathe, a plurality of work spindles each comprising means for chucking and rotating a crankshaft, motive means for rotating said work spindles, cutting tools associated with said work spindles, means for moving said cutting tools relative to said work spindles whereby cheeking operations may be undertaken on some of said spindles while pin turning operations are undertaken on other of said spindles, and means for operating said motive means at variable speed to maintain constant cutting speed for said cutting tools during said cheeking operations and to operate said motive means at slow speed for said pin turning operations.

36. In a lathe, a rotatable work spindle, an electric motor for rotating said spindle, a source of electric power, means for connecting or disconnecting said electric power from said motor, means for manually rotating said motor, and means to prevent manual rotation of said motor when said electric power is applied to said motor.

37. In a lathe, a rotatable work spindle, an electric motor for rotating said spindle, a source of electric power, means for connecting or disconnecting said electric power from said motor, means on the shaft of said motor for manual rotation of said motor, and means associated with said last mentioned means to disconnect said electric power from said motor when said motor is rotated manually.

38. In a multiple spindle orbital lathe, a plurality of rotatable work spindles, orbitally moving tool feeding devices associated with said spindles, means for feeding said devices relative to said work spindles, an electric motor for rotating said spindles, a source of electric power for operating said motor, and control means for said source of electric power operated by the means for moving said tool feeding devices to cause said motor to operate at a plurality of predetermined different speeds.

39. In a multiple spindle orbital lathe, a plurality of rotatable work spindles, orbitally moving tool feeding devices associated with said spindles, means for feeding said devices relative to said work spindles, an electric motor for rotating said spindles, a source of electric power for operating said motor, and control means for said source of electric power operated by the means for moving said tool feeding devices to cause said motor to operate at variable speed.

40. In a crankshaft lathe, means for chucking and rotating a plurality of crankshafts to be machined, tool feeding devices associated with said chucking and rotating means, cheeking tools mounted on said devices at least one for each crankshaft to be machined, and means for feeding said devices whereby said tools may simultaneously machine the cheeks of the webs adjacent bearing portions of said crankshafts.

41. In an orbital crankshaft lathe, means for chucking and rotating a plurality of crankshafts to be machined, orbitally moving tool feeding devices associated with said chucking and rotating means, cheeking tools mounted on said devices at least one for each crankshaft to be machined, and means for feeding said devices whereby said tools may simultaneously machine the cheeks of the webs adjacent the crankpins of said crankshafts.

42. In an orbital crankshaft lathe, means for chucking and rotating a plurality of crankshafts to be machined, orbitally moving tool feeding devices associated with said chucking and rotating means, cheeking tools mounted on said devices at least one for each crankshaft to be machined, and means for feeding said devices in coarse feed and rapid traverse return movements whereby said tools may simultaneously machine the cheeks of the webs adjacent the crank pins of said crankshafts.

43. In an orbital crankshaft lathe, means for chucking and rotating a plurality of crankshafts to be machined, orbitally moving tool feeding devices associated with said chucking and rotating means, cheeking tools mounted on said devices at least one for each crankshaft to be machined, and means for feeding said devices in rapid traverse forward, coarse feed, and rapid traverse return movements to cause said cutting tools to simultaneously machine the cheeks of the webs adjacent the crank pins of said crankshafts.

44. In an orbital crankshaft lathe, a plurality of work spindles adapted to chuck and rotate a plurality of crankshafts to be machined, means for rotating said spindles, orbitally moving tool feeding devices associated with said spindles, cheeking tools mounted on said devices at least one for each crankshaft to be machined, means for feeding said devices whereby said tools may simultaneously machine the cheeks of the webs adjacent the crank pins of said crankshafts, and means associated with said devices for controlling the means for rotating said spindles so as to vary the speed of rotation of said spindles to thereby maintain a constant cutting speed of said tools on said cheeks.

45. In an orbital crankshaft lathe, a plurality of work spindles adapted to chuck and rotate a plurality of crankshafts to be machined, means for rotating said spindles, orbitally moving tool feeding devices associated with said spindles, cheeking tools mounted on said devices at least one for each crankshaft to be machined, means for feeding said devices whereby said tools may simultaneously machine the cheeks of the webs adjacent the crank pins of said crankshafts, and means associated with said devices for controlling the means for rotating said spindles so as to cause said spindles to rotate at a plurality of predetermined different speeds to thereby maintain a substantially constant cutting speed of said tools on said cheeks.

46. In an orbital crankshaft lathe, means for chucking and rotating a plurality of crankshafts to be machined, orbitally moving tool feeding devices associated with said chucking and rotating means, crank pin turning tools mounted on said devices at least one for each crankshaft to be machined, and means for feeding said devices in rapid traverse forward, fine feed, dwell period, and rapid traverse return to cause said tools to simultaneously machine the crank pins of said crankshafts.

47. In an orbital crankshaft lathe, a plurality of work spindles adapted to chuck and rotate a plurality of crankshafts to be machined, means for rotating said spindles, orbitally moving tool feeding devices associated with said spindles, crank pin turning tools mounted on said devices at least one for each crankshaft to be machined, means for feeding said devices whereby said tools may simultaneously machine the crank pins of said crankshafts, and means associated with said devices for controlling the means for rotating said spindles so as to cause said spindles to rotate at a relatively high speed during the initial stage of the machining operation and at relatively slow speed during the final stage of said machining operation.

48. In an orbital lathe, a plurality of work spindles adapted for chucking and rotating work pieces in said lathe, orbitally moving tool feeding devices associated with said spindles, roughing and finishing tools mounted on said devices for engagement with work pieces in said lathe, and means for feeding said devices relative to said work spindles whereby roughing and finishing operations may be simultaneously undertaken on said work pieces in said work spindles.

49. In an orbital lathe, a plurality of work spindles adapted for chucking and rotating work pieces in said lathe, orbitally moving tool feeding devices associated with said spindles, roughing tools on said devices for some of said work spindles, finishing tools on said devices for others of said work spindles, and means for feeding said devices relative to said work spindles whereby roughing operations may be undertaken on work pieces on some of said spindles and finishing operations may be undertaken on work pieces on others of said spindles.

50. In an orbital lathe, a plurality of work spindles adapted for chucking and rotating work pieces in said lathe, orbitally moving tool feeding devices associated with said spindles, cutting tools, adapted to completely machine certain portions of said work pieces, mounted on said devices, other cutting tools, adapted to completely machine other portions of said work pieces, mounted on said devices, and means for feeding said devices relative to said work spindles whereby said cutting tools may be caused to complete their respective cutting operations on said work pieces.

51. In an orbital crankshaft lathe, a plurality of work spindles adapted to chuck and rotate crankshafts in said lathe, orbitally moving tool feeding devices associated with said spindles, cheeking tools on said devices for some of said spindles, crank pin turning tools on said devices for others of said spindles, and means for feeding said devices relative to said work spindles whereby said cutting tools may be caused to machine the cheeks of webs adjacent crank pins of the crankshafts on some of said spindles and to machine the crank pins of the crankshafts on others of said spindles.

52. In an orbital crankshaft lathe, a plurality of work spindles adapted to chuck and rotate crankshafts in said lathe, a plurality of orbitally moving tool feeding devices associated with said spindles, cheeking tools on each of said devices for some of said spindles, crank pin turning tools on each of said devices for others of said spindles, and means for feeding said devices relative to said work spindles whereby said cutting tools may be caused to simultaneously machine the cheeks of webs adjacent crank pins of the crankshafts on some of said spindles and the crank pins of the crankshafts on others of said spindles.

53. In an orbital crankshaft lathe, a plurality of work spindles adapted to chuck and rotate crankshafts in said lathe, orbitally moving tool feeding devices associated with said spindles, cheeking tools on said devices for some of said spindles, crank pin turning tools on said devices for others of said spindles, and means for feeding said devices at rapid traverse forward, coarse feed, fine feed, dwell period, and rapid transverse return relative to said work spindles whereby said cutting tools may be caused to machine the cheeks of webs adjacent crank pins of the crankshafts on some of said spindles and to machine the crank pins of the crankshafts on others of said spindles.

54. In an orbital crankshaft lathe, a plurality of work spindles adapted to chuck and rotate crankshafts in said lathe, orbitally moving tool feeding devices associated with said spindles, tools on said devices for some of said spindles adapted to machine the cheeks of the webs adjacent the crank pins and to partially machine the crank pins of said crankshafts, tools on said devices for others of said spindles adapted to complete the machining operations on said crank pins previously partially machined in some of said spindles, and means for feeding said devices relative to said work spindles to cause said tools to perform their respective machining operations.

55. In an orbital lathe, a frame, a master crankshaft rotatably mounted in said frame, means for moving a second master crankshaft about the axis of rotation of said first mentioned master crankshaft comprising a cradle having a structural section substantially surrounding and rotatably supporting said second master crankshaft and having spaced integral pivot arms journaled about the axis of rotation of said first mentioned master crankshaft, and means for actuating said cradle in swinging movement.

56. In a multiple spindle orbital lathe, a base, spaced housings mounted on said base, spaced steady rest units mounted on said base between said housings, rotatable work holders mounted on spaced axes in said housings steady rests associated with said work holders mounted on said units, a master crankshaft mounted in said base, a cradle pivotally mounted about the axis of rotation of said crankshaft, a second crankshaft rotatably carried in said cradle, means for rotating said work holders and crankshafts in synchronism, tool carrier units mounted on the pins of said crankshaft located between and each side of said steady rest units, and means to move said cradle to cause said tool carrier units to move relative to said work holders and steady rests.

57. In a multiple spindle orbital lathe, a base, spaced housings mounted on said base, spaced steady rest units mounted on said base between said housings, rotatable work holders mounted on spaced axes in said housings, steady rests associated with said work holders mounted on said units, tool carrier units mounted for orbital movement on said base located between and each side of said steady rest units, cutting tools mounted on said units, and means to cause relative feeding of said cutting tools and said work holders and steady rests.

WILLIAM F. GROENE.